United States Patent
Zhou et al.

(10) Patent No.: US 10,970,518 B1
(45) Date of Patent: Apr. 6, 2021

(54) VOXEL-BASED FEATURE LEARNING NETWORK

(71) Applicant: Apple Inc., Cupertino, CA (US)

(72) Inventors: Yin Zhou, San Jose, CA (US); Cuneyt O. Tuzel, Cupertino, CA (US); Jerremy Holland, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 16/188,879

(22) Filed: Nov. 13, 2018

Related U.S. Application Data

(60) Provisional application No. 62/586,036, filed on Nov. 14, 2017.

(51) Int. Cl.
| | |
|---|---|
| *G06K 9/00* | (2006.01) |
| *G06T 15/08* | (2011.01) |
| *G06T 7/521* | (2017.01) |
| *G06K 9/62* | (2006.01) |
| *G06T 9/00* | (2006.01) |

(52) U.S. Cl.
CPC ....... *G06K 9/00201* (2013.01); *G06K 9/6232* (2013.01); *G06K 9/6257* (2013.01);
(Continued)

(58) Field of Classification Search
CPC .............. G06K 9/00201; G06K 9/6257; G06K 9/6261; G06K 9/6232; G06T 9/002;
(Continued)

(56) References Cited

U.S. PATENT DOCUMENTS

| | | |
|---|---|---|
| 8,948,501 B1 | 2/2015 | Kim et al. |
| 9,218,542 B2 | 12/2015 | Zhan et al. |
| | (Continued) | |

FOREIGN PATENT DOCUMENTS

WO      2018148841      8/2018

OTHER PUBLICATIONS

Dominguez "Simultaneous Recognition and Relative Pose Estimation of 3D Objects Using 4D Orthonormal Moments" mdpi, Sep. 15, 2017 (Year: 2017).*
(Continued)

*Primary Examiner* — Barry Drennan
*Assistant Examiner* — Khoa Vu
(74) *Attorney, Agent, or Firm* — Robert C. Kowert; Kowert, Hood, Munyon, Rankin & Goetzel, P.C.

(57) ABSTRACT

A voxel feature learning network receives a raw point cloud and converts the point cloud into a sparse 4D tensor comprising three-dimensional coordinates (e.g. X, Y, and Z) for each voxel of a plurality of voxels and a fourth voxel feature dimension for each non-empty voxel. In some embodiments, convolutional mid layers further transform the 4D tensor into a high-dimensional volumetric representation of the point cloud. In some embodiments, a region proposal network identifies 3D bounding boxes of objects in the point cloud based on the high-dimensional volumetric representation. In some embodiments, the feature learning network and the region proposal network are trained end-to-end using training data comprising known ground truth bounding boxes, without requiring human intervention.

20 Claims, 11 Drawing Sheets

(52) U.S. Cl.
CPC ............ *G06K 9/6261* (2013.01); *G06T 7/521* (2017.01); *G06T 9/002* (2013.01); *G06T 15/08* (2013.01); *G06T 2207/10028* (2013.01); *G06T 2207/20081* (2013.01); *G06T 2207/20084* (2013.01); *G06T 2210/12* (2013.01)

(58) Field of Classification Search
CPC ..... G06T 7/521; G06T 15/08; G06T 2210/12; G06T 2207/10028; G06T 2207/20081; G06T 2207/20084
See application file for complete search history.

(56) References Cited

U.S. PATENT DOCUMENTS 9,965,719 B2   5/2018   Choi et al.

| | | | |
|---|---|---|---|
| 2016/0174902 A1* | 6/2016 | Georgescu | G06T 7/73 600/408 |
| 2018/0364717 A1* | 12/2018 | Douillard | G05D 1/0212 |
| 2019/0108639 A1* | 4/2019 | Tchapmi | G06N 5/04 |
| 2019/0147302 A1* | 5/2019 | Jampani | G06T 7/11 382/156 |
| 2019/0147320 A1* | 5/2019 | Mattyus | G06N 3/0454 382/155 |
| 2019/0340432 A1* | 11/2019 | Mousavian | G06K 9/3241 |

OTHER PUBLICATIONS

Yousefhussien et al. "A Fully Convolutional Network for Semantic Labeling of 3D Point Clouds" cs.CV Oct. 3, 2017. (Year: 2017).*
Dominguez "Simultaneous Recognition and Relative Pose Estimation of 3D Objects Using 4D Orthonormal Moments" mdpi, Sep. 15, 2017 (Year: 2017) (Year: 2017).*

* cited by examiner

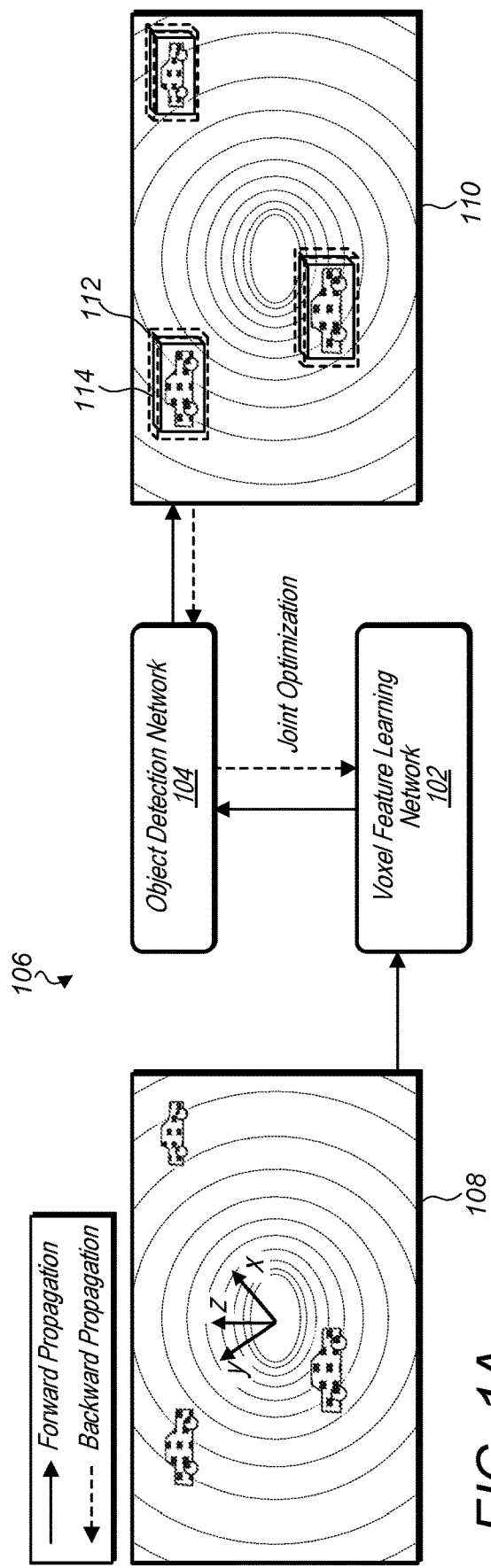
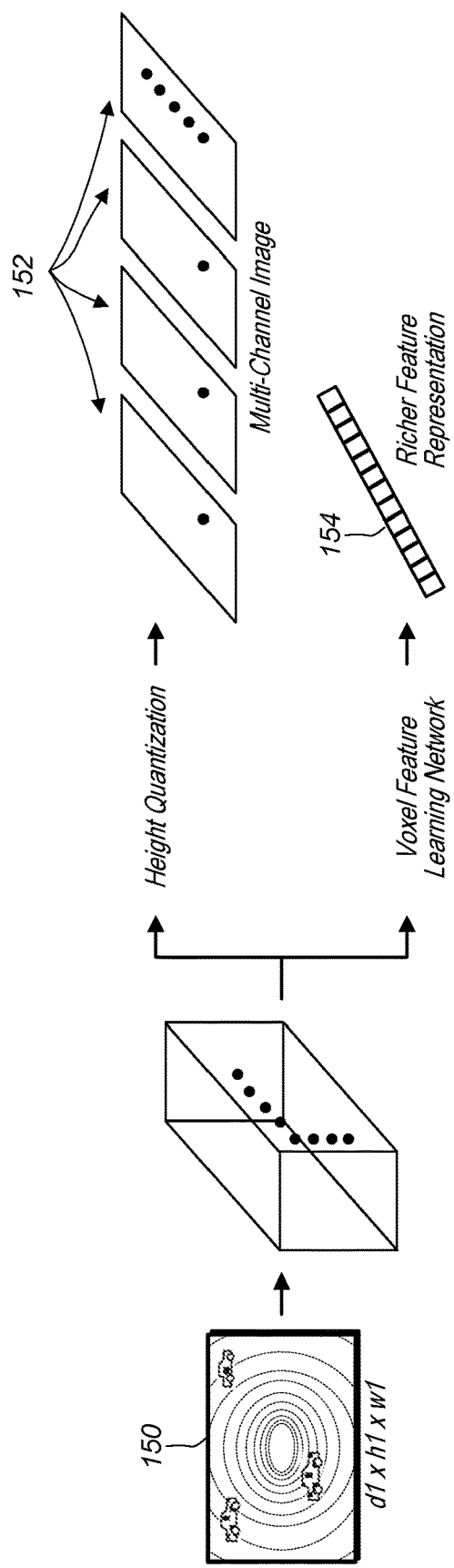
FIG. 1A
FIG. 1B

VOXEL-BASED FEATURE LEARNING NETWORK

This application claims benefit of priority to U.S. Provisional Application Ser. No. 62/586,036, entitled "End-to-End Learning for Point-Cloud-Based 3D Object Detection," filed Nov. 14, 2017, and which is incorporated herein by reference in its entirety.

BACKGROUND

Technical Field

This disclosure relates generally to systems and algorithms for machine learning and more specifically to 3D object detection.

Description of Related Art

Point cloud based 3D object detection may be considered an important component in a variety of real-world applications, such as autonomous navigation, housekeeping robots, and augmented/virtual reality. Compared to image-based detection, point clouds may provide more reliable depth information, useable to more accurately localize objects and characterize their shapes. Unlike images, a point cloud generated from one or more laser sensors, such as a Lidar system, may be sparse with a highly variable point density. This may be due to various factors such as non-uniform sampling of 3D space, the effective range of the sensor, occlusion, and/or a relative pose of an object being detected. To overcome such challenges, different approaches have been tried to manually craft feature representations/feature filters for 3D object detection. However, these manually designed choices generally introduce an information bottleneck that prevents effectively exploiting 3D shape information and may require invariances for a given detection task.

Additionally, an end-to-end deep neural network may learn point-wise features directly from a point cloud and/or may learn local structures at different scales. However, to achieve satisfactory results, these approaches may require training feature transformer networks on all input points (~1 k points). For common real-world point clouds containing ~100 k points, training these architectures may impose exorbitant computational and memory requirements rendering such approaches infeasible.

SUMMARY OF EMBODIMENTS

Described herein are methods, systems and/or techniques for implementing a 3D voxel feature learning/detection network that may be configured to learn voxel features automatically from raw point cloud data (e.g., a LiDAR point cloud). The 3D voxel feature learning/detection network may capture subtle 3D shape information that is typically lost due to quantization or due to other processing steps in previous systems. In some embodiments, integrating a 3D voxel feature learning/detection network, as described herein, with an existing object detection network, or other region proposal network, may lead to improved mean average object detection precision (mAP). For example, mean average object detection precision (mAP) may be improved from 88.0%→89.2% and/or reduced mean orientation error may be reduced from 2.5 deg→0.82 deg as compared to previous point cloud object detection networks. In addition, a 3D voxel feature learning/detection network, as described herein, may improve prediction stability through time. Additionally, a system configured to implement a 3D voxel feature learning/detection network, as described herein, may be considered a generic feature learning module that may be configured to seamlessly integrate and train jointly with many other 3D machine learning models, such as: 3D object detection, 3D scene understanding, 3D point cloud matching, 3D object/human pose estimation, etc.

Accurately detecting 3D objects in point clouds may be considered a central problem in many real-world applications, such as autonomous navigation, housekeeping robots, and/or augmented/virtual reality. A system based on the methods, systems and/or techniques described herein may remove the need to manually engineer feature representations/feature filters for 3D point cloud object detection systems. A system based on the methods, systems and/or techniques described herein may include, or may be considered, a generic 3D voxel feature learning/detection network that may unify feature extraction and/or bounding box prediction with another object detection network, such as a region proposal network, to result in a single, end-to-end trainable, deep neural network system. A 3D voxel feature learning/detection network, as described herein, may divide a point cloud into equally spaced 3D voxels and may transform a group of points within each voxel into a unified feature representation (such as through one or more Voxel Feature Encoding (VFE) layers, for example). In this way, a point cloud may be encoded as a descriptive high-dimensional volumetric representation, which may then be connected to a region proposal network (RPN) (or other 3D machine learning module) to generate 3D detection results. For instance, experiments on the KITTI car detection benchmark (Karlsruhe Institute of Technology), according to one example embodiment, show that a 3D voxel feature learning/detection network, as described herein, may outperform other state-of-the-art LiDAR based 3D detection methods by a large margin, possibly even surpassing the accuracy of approaches that use both RGB images and LiDAR. Furthermore, a 3D voxel feature learning/detection network, as described herein, effectively may be configured to learn shape representations of objects with various geometries, such as for 3D detection of pedestrians and/or cyclists, based only on LiDAR information, in some embodiments.

In some embodiments, a system includes one or more processors and a memory coupled to the one or more processors, wherein the memory comprises program instructions configured to implement, via the one or more processors, a voxel feature learning network. The voxel feature learning network is configured to receive a point cloud comprising a plurality of points located in a three-dimensional space and group respective sets of the points of the point cloud into respective voxels, wherein the respective points are grouped into the respective voxels based on locations of the respective points in the three-dimensional space and locations of the voxels in the three-dimensional space, wherein each voxel corresponds to a volume segment of the three-dimensional space. The voxel feature learning network is also configured to determine, for each of one or more of the respective voxels, a voxel feature, wherein the voxel feature is determined based on point-wise features identified from the respective points included in the voxel. The voxel feature learning network is also configured to provide a four-dimensional (4D) tensor representation of the point cloud comprising the determined voxel features for the respective voxels.

In some embodiments, the 4D tensor representation may be provided to an object detection network, such as a region proposal network, and based on results of object detection by the object detection network using the 4D tensor representation, the voxel feature learning/detection network may be trained. For example, the voxel feature learning/detection network may be trained to identify different point-wise features and/or voxel features based on the performance of the object detection network when using sparse 4D tensor representations provided by the voxel feature learning/detection network to detect objects in training data.

In some embodiments, a voxel feature learning/detection network may include a fully connected neural network comprising a plurality of voxel feature encoding (VFE) layers. In order to determine a voxel feature for a respective voxel of a point cloud, the fully connected neural network comprising the voxel feature encoding layers may determine one or more point-wise features from a set of points included in a portion of the point cloud corresponding to a voxel. Additionally, the fully connected neural network may determine a locally aggregated feature from the point-wise features, and determine point-wise concatenated features using the determined point-wise features and the locally aggregated feature. The fully connected neural network may further transform the output of the voxel feature encoding layers and apply element-wise max-pooling to determine a voxel-wise feature for the voxel. The voxel-wise feature may further be included in a sparse four-dimensional (4D) tensor along with voxel-wise features determined for other voxels of the point cloud, wherein the sparse (4D) tensor is an alternate representation of the original point cloud that greatly reduces the memory usage and computational cost during back-propagation, such as occurs during training of an object detection network and training of the voxel feature learning/detection network, for example using ground truth training data.

In some embodiments, a computer implemented method performed by one or more computers includes subdividing a three-dimensional (3D) space of a point cloud into equally spaced voxels, wherein the point cloud includes information regarding one or more points within a 3D coordinate system, and wherein each of the one or more points resides in one of the voxels. The method further includes grouping the points of the point cloud according the particular voxels in which they reside and identifying point-wise concatenated features based on the selected points. Additionally, the method includes determining voxel features based on the point-wise concatenated features and representing the determined voxel features as a sparse 4D tensor.

In some embodiments, a non-transitory, computer-readable storage medium stores program instructions, that when executed on one or more computers, cause the one or more computers to receive a point cloud comprising a plurality of points located in a three-dimensional space and group respective sets of the points of the point cloud into respective voxels, wherein the respective points are grouped into the respective voxels based on locations of the respective points in the three-dimensional space and positions of the voxels in the three-dimensional space, wherein each voxel corresponds to a volume segment of the three-dimensional space. The program instructions, when executed on the one or more processors further cause the one or more processors to determine, for each of one or more of the respective voxels, a voxel feature, wherein the voxel feature is determined based on the point-wise features identified from the respective points included in the respective voxels. The program instructions, when executed on the one or more processors further cause the one or more processors to provide a four-dimensional (4D) tensor representation of the point cloud comprising the determined voxel features as one of the four dimensions.

BRIEF DESCRIPTION OF THE DRAWINGS

FIG. 1A is a high-level diagram illustrating end-to-end learning between a voxel feature learning/detection network and an object detection network, according to some embodiments.

FIG. 1B is a high-level diagram illustrating contrasts between a voxel feature learning/detection network and other systems that utilize height quantization to generate a multi-channel image, according to some embodiments.

Figure 2:
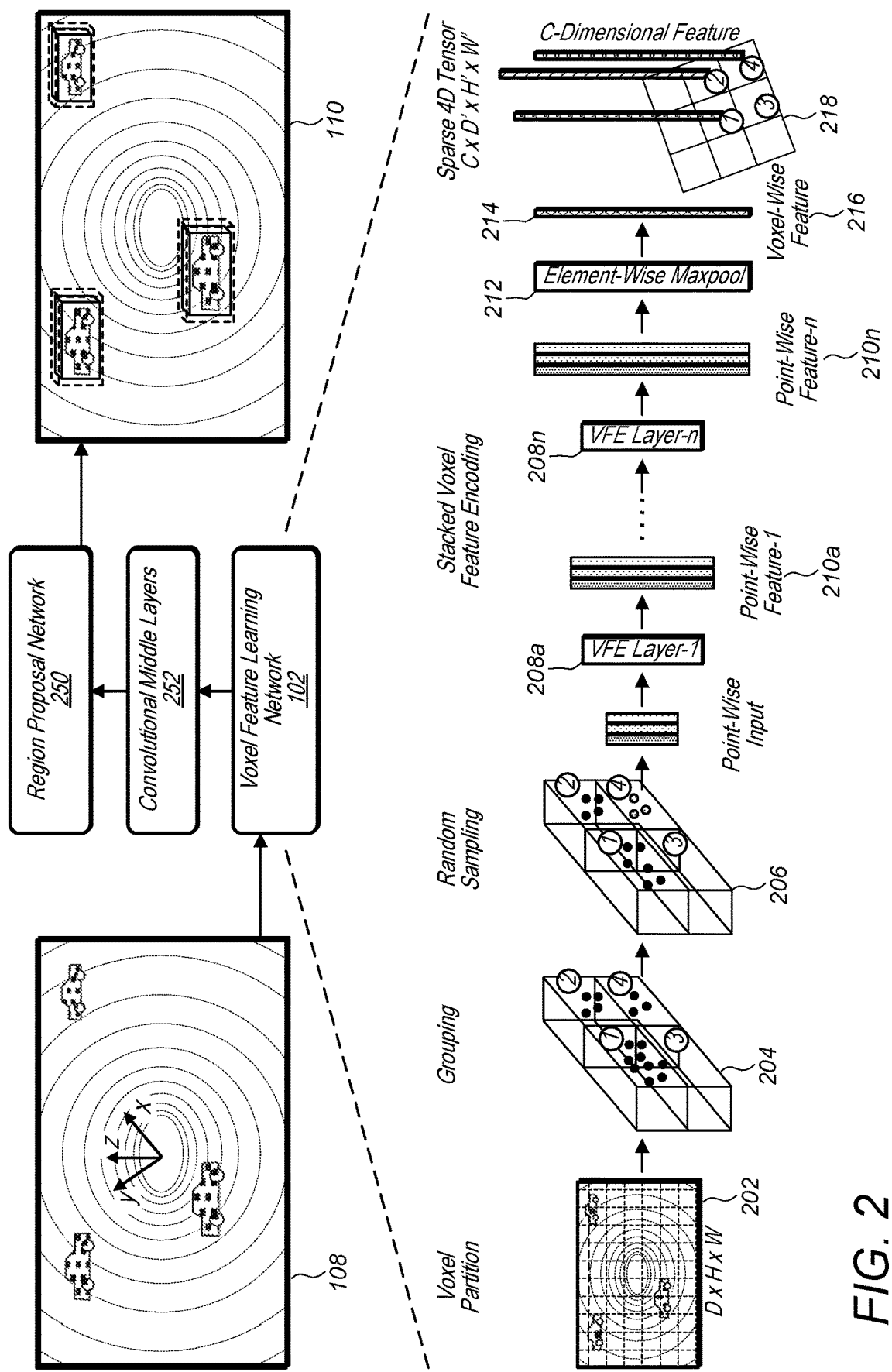
FIG. 2 is a logical block diagram illustrating a system configured to implement a 3D object detection framework that includes a voxel feature learning/detection network and further illustrates functionality of the voxel feature learning/detection network, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Described herein are methods, systems and/or techniques for a generic 3D detection network and/or framework that may be configured to simultaneously learn effective features from point clouds and predict accurate 3D bounding boxes, in an end-to-end fashion.

A point cloud may include a set of data points within a coordinate system. For example, in a three-dimensional coordinate system, points within a point cloud may be defined by X, Y, and Z coordinates. A point cloud may include data about, and may represent, one or more objects and spatial relations between objects. For example, a point cloud may include LiDAR information regarding objects around a vehicle, such as other vehicles, pedestrians, etc. In some embodiments, the points of a point cloud may further include one or more attribute values, such as a reflectance at the respective points.

In order to detect objects in a point cloud scene, some 3D object detection systems transform point cloud data into a bird's eye view (BEV) of the point cloud and further slice the BEV data at set heights. Points falling between the slices are flattened to reside in the nearest height slice. In this way, 3D point cloud data is condensed into 2D images that can be analyzed to determine objects in the point cloud. However, such systems lose 3D subtleties of the point cloud, such as height variations between slices, when quantizing the points into flat slices. Such 3D subtleties when preserved (and not lost due to quantization) may allow for distinctions between a front of a vehicle and a rear of a vehicle to be determined. Also such 3D subtleties when preserved (and not lost due to quantization) may allow for better pose estimation of a person to be performed, as another one of many examples. However, in systems that flatten point cloud data into slices, such distinctions, such as front versus rear, or pose, may not be accurately determinable. For example, such systems may be able to identify an overall silhouette of a vehicle, but may not be able to accurately determine the orientation of the vehicle (e.g. directed towards an observer or away from the observer). Also, such systems may perform well at identifying overall silhouettes of vehicles that are at a mid-range from an observer, such as a LiDar sensor, but may not accurately identify vehicles that are far-away or large vehicles that are close-up. For example, a far-away vehicle may not be detectable because the 3D subtleties of the vehicle are lost in quantization and are not distinguishable by such systems from a background scene. As another example, a large close up vehicle may not be distinguishable because contour information of the vehicle is lost in quantization such that the large up close vehicle appears as wall or other solid object, or is disregarded because it does not fit a known object type.

Additionally, previous systems such as BEV/height quantization systems, and/or other systems may utilize specially engineered filters to detect particular features. For example, an engineer designing or implementing the object detection system may make determinations as to which features to look for in the 3D point cloud to detect objects, such as vehicles. Such "hand-crafted features" may be a bottle-neck in the training of neural networks because significant time is required for the "hand-crafted features" to be selected and implemented by engineers.

Moreover, previous systems have operated on dense data and converted sparse point cloud data into more densely represented data, such as by transforming the point cloud data into a bird's eye view and performing height slices, as described above. However, such data transformations may introduce artifacts into the data prior to applying the "hand crafted feature" filters or other filters. These artifacts may further reduce precision accuracy of such systems.

In some embodiments, a voxel feature learning/detection network is configured to receive raw point cloud data (without converting the point cloud data to a BEV or performing height slices). As described in more detail below, the voxel feature learning/detection network is configured to determine voxel features for a plurality of voxels of the point cloud, wherein a voxel is a 3D volume of the point cloud, for example a cuboid or a rectangular volume. The voxel feature learning/detection network is further configured to provide a sparse 4D tensor representation of the point cloud comprising the voxel features as a fourth dimension, wherein the location of a voxel that corresponds with to given voxel feature is indicated in the 4D tensor using the coordinates of the voxel (e.g. X, Y, and Z position of the voxel). In this way, a sparse point cloud comprising multiple thousands of points (e.g. 100,000 points or more) may be converted into a more dense data structure that can be used by another object detection system, such as a region proposal network, to detect 3D objects in the point cloud.

In some embodiments, a voxel feature learning/detection network is implemented as a first fully-connected neural network and a region proposal network is implemented as another fully-connected neural network. The voxel feature learning/detection network and the region proposal network may be joined to create an end-to-end network. The end-to-end network may train using training data comprising ground truth information about 3D objects included in a point cloud. The voxel feature learning/detection network may train itself on which features to identify in the raw point cloud data to generate the voxel features to be included in the 4D tensor representation provided by the voxel feature learning/detection network. In this way, the need for an engineer to determine "hand-crafted features" may be eliminated. Training of the voxel feature learning/detection network is described in more detail below.

In some embodiments, a system configured to implement a voxel feature learning/detection network may include and/or utilize one or more Voxel Feature Encoding (VFE) layer which may enable accounting for inter-point interaction within the same voxel, such as by combining point-wise features with a locally aggregated feature. Stacking VFE layers hierarchically may allow a voxel feature learning/detection network to learn complex features for characterizing local 3D shape information, according to some embodiments. Specifically, a voxel feature learning/detection network or framework as described herein may divide a point cloud into equally spaced 3D voxels, encode each voxel via stacked VFE layers to determine a sparse 4D tensor representation of the point cloud. In some embodiments, one or more convolutional middle layers may further aggregate local voxel features (such as by 3D convolution), thereby transforming the point cloud into a high-dimensional volumetric representation. Additionally, in some embodiments, a region proposal network (RPN) may consume the high-dimensional volumetric representation and yield a 3D object detection result. This efficient algorithm may benefit both from sparse point structure and efficient parallel processing of the voxel grid, according to some embodiments.

A voxel feature learning/detection network or framework as described herein may be evaluated on the 3D localization task and the full 3D detection task, such as provided by the KITTI benchmark in some embodiments. Experimental results show that according to at least one example embodiment, the a 3D detection network or framework as described herein that includes a voxel feature learning/detection network may outperform traditional state-of-the-art LiDAR based 3D detection methods by a large margin and may also surpass the accuracy of approaches that use both RGB image and LiDAR. In some embodiments, a voxel feature learning/ detection network, as described herein, may additionally or alternatively be used in detecting pedestrians and cyclists from a LiDAR point cloud.

Please note that the methods, systems and/or techniques described herein may refer to both a 3D voxel feature learning/detection network and/or a 3D voxel feature learning/detection framework. However, any methods, systems and/or techniques described herein regarding a 3D voxel feature learning/detection network may also apply to a 3D voxel feature learning/detection framework and vice versa. Additionally, a 3D voxel feature learning/detection network, a 3D voxel feature learning/detection framework and/or a system configured to implement such a network, framework (and/or other methods, systems and/or techniques described herein) may be referred to herein simply as the network, the framework and/or the system.

FIG. 1A is a high-level diagram illustrating end-to-end learning between a voxel feature learning/detection network and an object detection network, according to some embodiments.

In some embodiments, a voxel feature learning/detection network, such as voxel feature learning network 102, and an object detection network, such as object detection network 104, may combine to form an integrated network 106 capable of end-to-end learning for point cloud based 3D object detection. Raw point cloud data, such as point cloud data 108, may be provided to the voxel feature learning network 102, and a more dense representation of the point cloud data, such as a 4D tensor or high-dimensional volumetric representation of the point cloud, may be provided to the object detection network 104 to produce 3D object detection results 110. In some embodiments, training data may be used to train the object detection network 104 and voxel feature learning network 102, wherein the training data includes ground truth bounding boxes 114. Object detection bounding boxes 112 included in the 3D object detection result 110 may be compared to the ground truth bounding boxes 114 to train the object detection network 102 and voxel feature learning network 102. In some embodiments, an object detection network, such as object detection network 104, and a voxel feature learning/detection network, such as voxel feature learning network 102, may perform a joint optimization wherein forward and backward propagation is performed between the object detection network and the voxel feature learning/detection network. In this way, a voxel feature network may be trained without the use of "hand-crafted features."

In some embodiments, a voxel-feature learning/detection network, such as voxel feature learning network 102, may be connected to other types of point cloud analysis networks or frameworks. For example, in some embodiments, a voxel feature learning/detection network, such as voxel feature learning network 102, may be alternatively or additionally, connected to a 3D scene understanding network, a point cloud matching network, a human pose estimation network, or various other point cloud analysis networks or frameworks. In some embodiments, a voxel feature learning/network may be trained using an object detection network, such as object detection network 104, and once trained may be used in conjunction with a 3D scene understanding network, a point cloud matching network, a human pose estimation network, or various other point cloud analysis networks or frameworks.

FIG. 1B is a high-level diagram illustrating contrasts between a voxel feature learning/detection network and other systems that utilize height quantization to generate a multi-channel image from a source point cloud, according to some embodiments.

As discussed above, some systems may receive a raw point cloud such as point cloud 150, and perform a height quantization on the points included in the point cloud 150 that results in multi-channel images 152, wherein the points of the point cloud have been flattened into images at varying heights within the point cloud. As described above, such height quantization of the points of the point cloud may cause 3D subtleties to be lost, and therefore reduce precision accuracy and reduce the probability of correctly estimating orientation for example of a vehicle, identification of far-away vehicles, and/or identification of large, up-close vehicles.

In contrast, a voxel feature learning network may output a sparse 4D tensor 154 that includes a richer feature representation of the point cloud, without height quantization that results in 3D subtleties being lost. In some embodiments, point cloud 150 may include as many as 100,000 points or more, which may exceed the abilities of current object detection networks, such as a region proposal network. However, by condensing the 100,000 or more points of the point cloud into a sparse 4D tensor, the voxel feature learning/detection network may provide a data structure that is manageable by an object detection network, such as a region proposal network. At the same time, the voxel feature learning/detection network may preserve the 3D subtleties of the point cloud that would otherwise be lost in systems that condense the point cloud using height quantization or other reduction techniques. Additionally, the voxel feature learning/detection network may learn features based on training data and may not operate based on arbitrarily selected constraints, such as arbitrarily selected height slices. Note that even though the point cloud is grouped into voxels, when using a voxel feature learning/detection network, the points of the point cloud are preserved and included in the voxels along with all of the original attributes of the points (e.g. spatial information in X, Y, and Z and/or additional attributes, such as reflectance).

Voxel Feature Learning Network

FIG. 2 is a logical block diagram illustrating a system configured to implement a 3D object detection framework that includes a voxel feature learning/detection network and further illustrates functionality of the voxel feature learning/ detection network, according to one embodiment.

Voxel Partition: In some embodiments, given a point cloud, such as point cloud 202, a voxel feature learning/ detection framework, such as voxel feature learning network 102, may subdivide the 3D space of the point cloud into equally spaced voxels based on the LiDAR coordinate system. For example, point cloud 202 is partitioned to include a plurality of voxels 204 (e.g. Voxles1-4), wherein the points of the point cloud reside in respective ones of the voxels 204. For instance, suppose a point cloud encompasses a 3D space with range D, H, W along the Z, Y, X axes respectively. Each voxel of size $v_D$, $v_H$ and $v_W$ may be defined accordingly. Thus, the resulting 3D voxel grid may be of size $D'=D/v_D$, $H'=H/v_H$, $W'=W/v_W$. For simplicity, D, H, W are assumed herein to be a multiple of $v_D$, $v_H$ and $v_W$ (e.g. the voxel depth, voxel height, and voxel width).

Grouping: The points of the raw point cloud may be grouped according to the voxel within which they reside in. Due to factors, such as distance, occlusion, an object's relative pose, and non-uniform sampling, the LiDAR point cloud may be sparse and have highly variable point density throughout the 3D space of the point cloud. Therefore, after grouping, respective voxels may contain variable numbers of points as compared to other voxels. An example illustration of four representative voxels 204 is shown in FIG. 2, wherein Voxel-1 has significantly more points than Voxel-2 and Voxel-4, while Voxel-3 contains no points.

Random Sampling: In some embodiments, a high-definition LiDAR point cloud may be composed of 100,000 points or more. Directly processing all the points may impose exorbitant memory/efficiency burdens on the computing platform and may also include substantial redundancy, which may result in overfitting and/or noise sensitivity. In some embodiments, a fixed number of points, T, from those voxels containing more than T points may be randomly sampled to reduce the number of points to be less than or equal to T number of points. This sampling strategy may, in some embodiments, be considered to have two purposes: (1) computational savings; and (2) correcting for appearances of surfaces that may have been changed due to non-uniform sampling performed by the sensor throughout the space. Additionally, random sampling may introduce more variation, thereby potentially regularizing the training of the voxel feature learning/detection network 102 and leading to better generalization, according to some embodiments. For example, representative voxels 206 have undergone random sampling of the points included in Voxel-1 to reduce the number of points included in Voxel-1 to less than or equal to T points.

Stacked Voxel Feature Encoding: In some embodiments, a voxel feature learning/detection network, such as voxel feature learning network 102, may include a chain of Voxel Feature Encoding layers (VFE), such as VFE layers 208a through 208n. For simplicity, FIG. 2 illustrates the hierarchical feature encoding process for a single voxel. While described herein generally in regard to VFE Layer-1 (e.g. VFE layer 208a), the methods, systems and/or techniques described herein with regard to VFE Layer-1 (e.g. VFE layer 208a) may also apply to any and/or all layers in the chain of Voxel Feature Encoding layers (e.g. any or all of VFE layers 208a through 208n).

Figure 3:
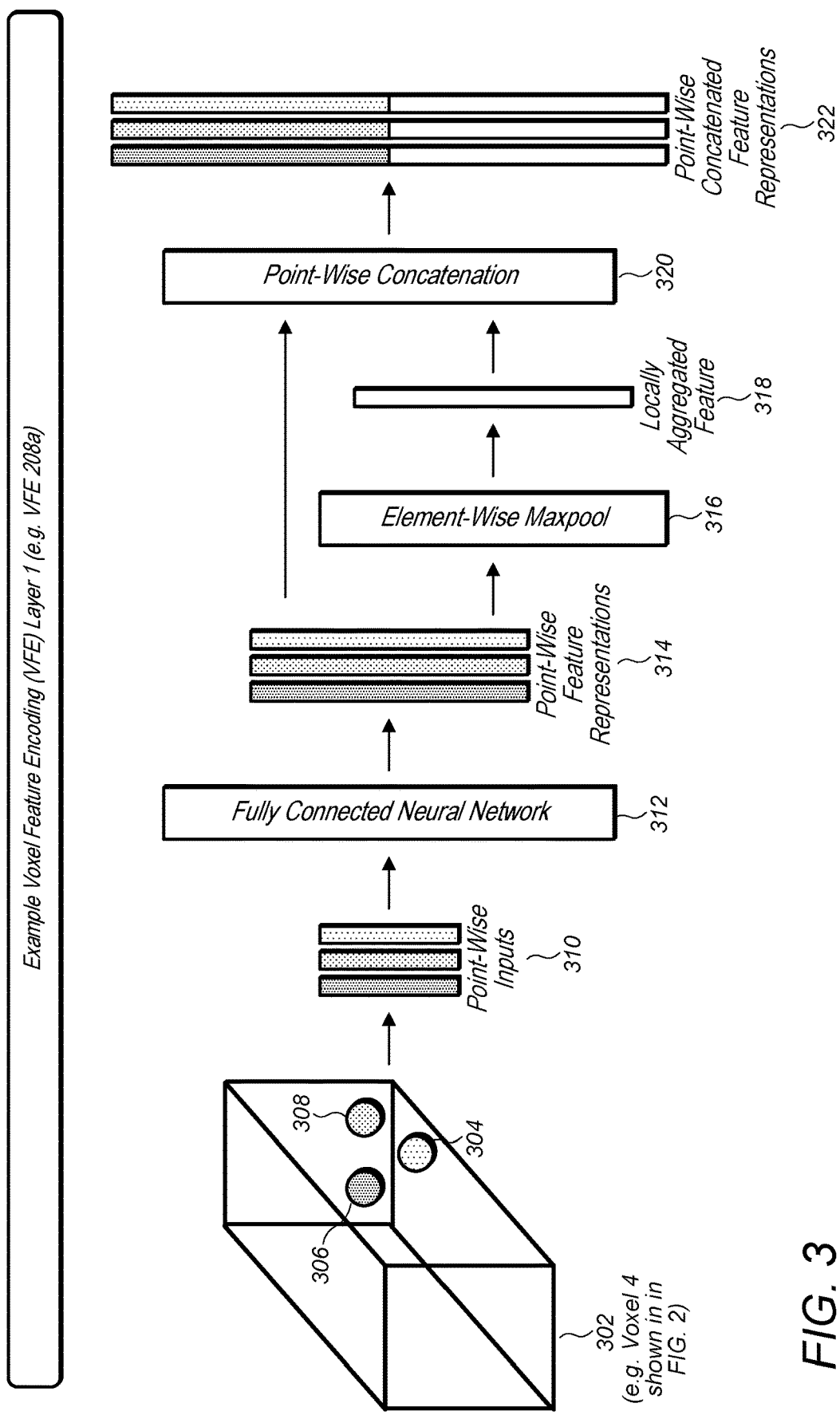
FIG. 3 is a logical block diagram illustrating an example architecture for a voxel feature encoding (VFE) layer, according to some embodiments.

FIG. 3 is a logical block diagram illustrating a more detailed example architecture for a single voxel feature encoding (VFE) layer, such as VFE Layer-1 (e.g. VFE layer 208a).

The VFE layer-1 (e.g. VFE layer 208a) receives voxel 302 (e.g. voxel 4 from FIG. 2) which may be denoted as voxel $V=\{p_i=[x_i, y_i, z_i, r_i]^T \in \mathbb{R}^4\}_{i=1 \ldots t}$. The voxel 302 may be a non-empty voxel containing $t \leq T$ LiDAR points, where each point $p_i$ contains XYZ coordinates for the i-th point and $r_i$ is the received reflectance for the i-th point. For example, non-empty voxel 302 may be voxel 4 of representative voxels 206 that have undergone random sampling. Voxel 302 includes points 304, 306, and 308, which each may have associated X, Y, and Z coordinates in 3D space and one or more associated attributes, such as respective reflectances.

The local mean of the points 304, 306, and 308, of the voxel 302, may be computed as the centroid of all the points in voxel V (e.g. voxel 302), wherein the centroid of the voxel (e.g. voxel 302) is denoted as $(v_x, v_y, v_z)$. Then each point $p_i$ of voxel 302 may be augmented with the relative offset w.r.t. the centroid of the voxel 302 and the point-wise input feature set $V_{in}=\{\hat{p}_i=[x_i; y_i; z_i; r_i; x_i-v_x; y_i-v_y; z_i-v_z]^T \in \mathbb{R}^7\}_{i=1 \ldots t}$ may be obtained (e.g. point-wise input 310). Next, each augmented point $\hat{p}_i$ may be transformed, such as through a Fully Connected Neural Net (FCNN) (e.g. FCNN 312), into a feature space, where information may be aggregated from the point features $f_i \in \mathbb{R}^{4m}$ to encode the shape of the surface encapsulated within the voxel. In one embodiment, the FCNN 312 may be composed of a linear layer, a batch normalization (BN) layer, and a rectified linear unit (ReLU) layer.

After obtaining point-wise feature representations 314, element-wise max pooling 316 may be used across all $f_i$ associated to the voxel V (e.g. voxel 302) to get the locally aggregated voxel feature $\tilde{f} \in \mathbb{R}^{4m}$ (e.g. locally aggregated feature 318) for voxel V (e.g. voxel 302). Additionally, in some embodiments each $f_i$ may be augmented with $\tilde{f}$ to form a point-wise concatenated feature as $F_i^{out}=F_i^{out}=[f_i^T, \tilde{f}^T]^T \in \mathbb{R}^{4 \cdot 2m}$. For example point-wise concatenation 320 may be performed to yield point-wise concatenated feature representations 322. Thus, the output voxel feature set for the voxel 302, $V_{out}=\{f_i^{out}\}_{i \ldots t}$ may be obtained.

All non-empty voxels of a point cloud, such as point cloud 202, may be encoded in a similar way as described above for voxel 302 and, in some embodiments, the processing of the other voxels may share the same set of parameters in FCNN 312. In some embodiments, $VFE_i(C_{in}, C_{out})$ may be used to represent the i-th VFE layer that may transform input features of dimension $C_{in}$ into output features of dimension $C_{out}$. The linear layer may learn a matrix of size $$c_{in} \times \left(\frac{c_{out}}{2}\right),$$

and the point-wise concatenation may yield the output of dimension $C_{out}$.

Because the output feature may combine both point-wise features and a locally aggregated feature, stacking VFE layers may encode point interactions within a voxel and may enable the final feature representation to learn descriptive shape information according to some embodiments. The voxel-wise feature 216 (shown in FIG. 2) may be obtained by transforming the output of VFE-n into $\mathbb{R}^c$ via FCNN and applying element-wise max pooling 212 where C is the dimension of the voxel-wise feature, according to one example embodiment.

Sparse Tensor Representation: In some embodiments, a list of voxel features may be obtained by processing only the non-empty voxels of a point cloud, such as of point cloud 202. Each voxel feature may be uniquely associated to the spatial coordinates of a particular non-empty voxel. The obtained list of voxel-wise features can be represented as a sparse 4D tensor, of size C×D'×H'×W' as shown in FIG. 2 for sparse 4D tensor 218. For example each of voxels 1, 2 and 4 have an associated voxel feature 214 in the sparse 4D tensor representation 218. Although a point cloud may contain ~100 k points, more than 90% of voxels may typically be empty. Representing non-empty voxel features as a sparse tensor, such as sparse 4D tensor 218, may reduce (potentially greatly reduce) memory usage and/or computation cost during backpropagation, and therefore may be considered a critical step in an efficient implementation, according to some embodiments.

Figure 4:
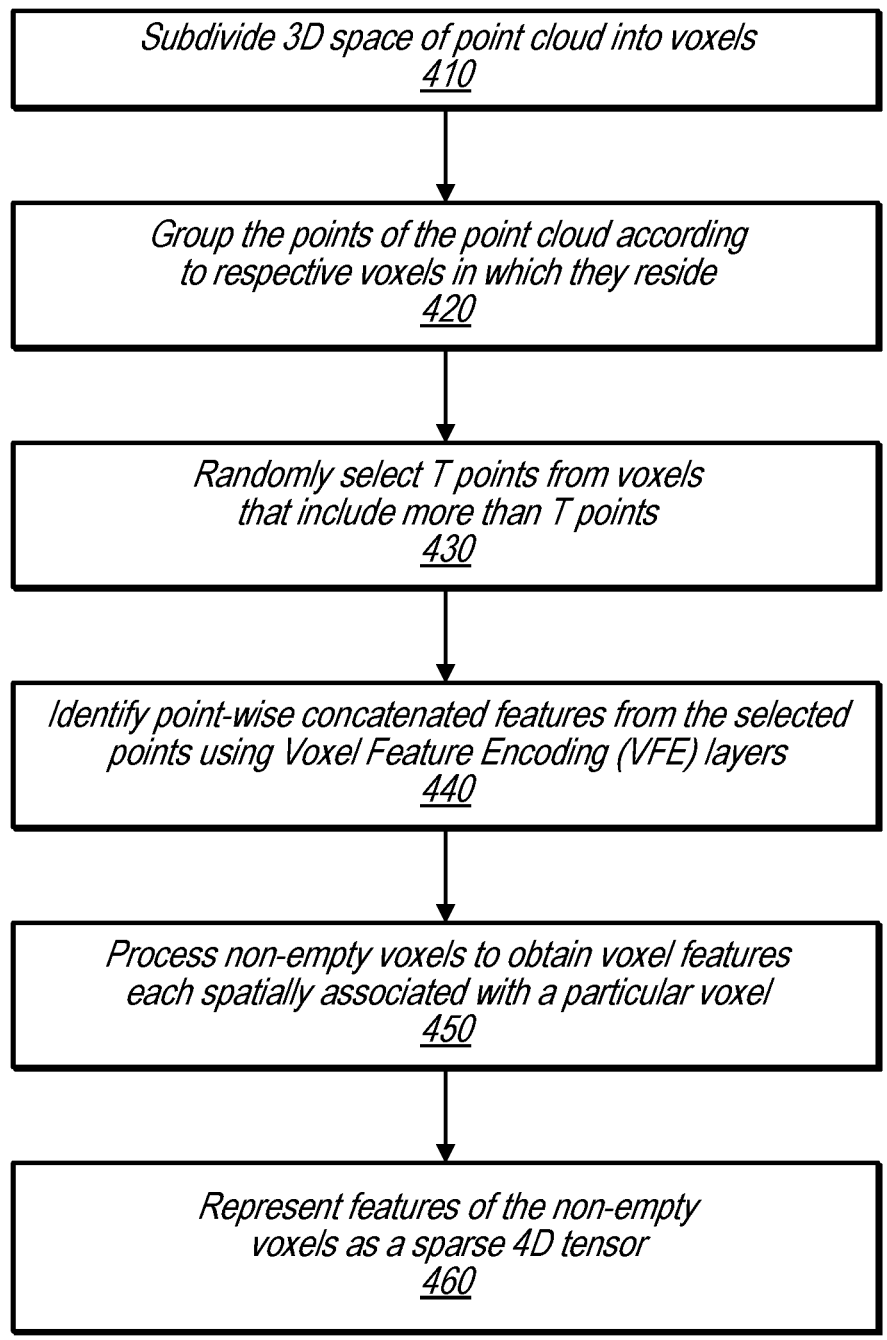
FIG. 4 is a flowchart illustrating a method of generating, from a raw point cloud, a sparse 4D tensor comprising voxel features for a plurality of voxels, according to some embodiments.

FIG. 4 is a flowchart illustrating a method of generating, from a raw point cloud, a sparse 4D tensor comprising voxel features for a plurality of voxels, according to some embodiments.

At 410 a voxel feature learning/detection network subdivides a 3D space of a received point cloud into voxels. In some embodiments, the voxels may be evenly spaced cuboids or rectangular volumes. In some embodiments, voxels may overlap.

At 420, the voxel feature learning/detection network groups the points of the point cloud into respective voxels according to the voxels in which the respective points reside.

At 430, for voxels that include more than a threshold number of points (T), the voxel feature learning/detection network randomly samples the points of the voxels with more than T points. The random sampling reduces the points in these voxels to be equal to or less than T points.

At 440, the voxel feature learning/detection network identifies point-wise concatenated features for each voxel using the points included in the respective voxels subsequent to random sampling. The point-wise concatenated features are determined as discussed above in regard to FIGS. 2 and 3, and as described in more detail below in regard to FIG. 5.

At 450, the point-wise concatenated features determined at 440 are further processed to determine a voxel feature for each non-empty voxel.

At 460, the voxel features for each voxel are represented in a four-dimensional (4D) tensor, such as the 4D tensor representation 218 shown above in FIG. 2. In the 4D tensor representation, coordinates of each voxel may be represented using three dimensions, e.g. X, Y, and Z, and a voxel feature for the each non-empty voxel may be represented by a fourth dimension, C.

Figure 5:
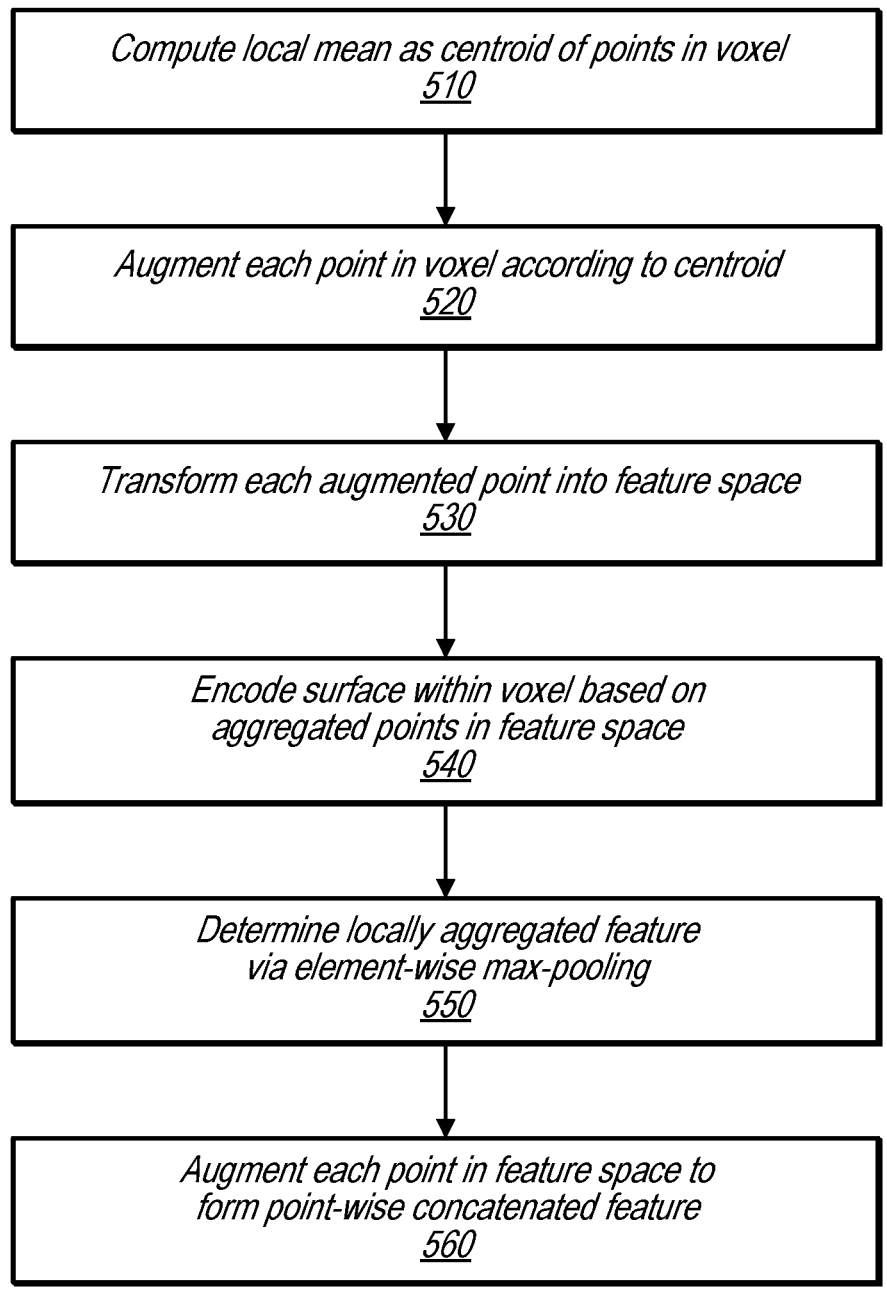
FIG. 5 is a flowchart illustrating a method for encoding stacked voxel features based on a set of points included in a respective voxel, according to some embodiments.

FIG. 5 is a flowchart illustrating a method for encoding stacked voxel features based on a set of points included in a respective voxel, according to some embodiments.

At 510, a voxel feature encoding layer of a voxel feature learning/detection network computes a local mean as a centroid of points included in a respective voxel.

At 520, each point of the voxel is augmented according to the centroid. This embeds relationships between the points into an input feature set for a fully connected neural network of the voxel feature encoding layer.

At 530, the fully-connected neural network identifies point-wise features in the points included in the input feature set and transforms the points of the input feature set into a feature space.

At 540, the voxel feature encoding layer encodes a surface represented by the points included in the voxel based on the aggregated points transformed into the feature space.

At 550, the voxel feature encoding layer determines locally aggregated features of the surface represented by the points included in the voxel via element-wise max pooling. And, at 560, the voxel feature encoding layer augments each point in feature space to form point-wise concatenated features. The point-wise concatenated features are output from the voxel feature encoding layer (VFE) (e.g. the output of 440 in FIG. 4) and are further processed to obtain a voxel feature for a respective voxel. As described in 460, a voxel feature for each non-empty voxel is represented in a sparse 4D tensor representation of the point cloud, wherein the sparse 4D tensor representation may be further processed to identify objects in the point cloud, or for other types of point cloud analysis.

Convolutional Middle Layers

In some embodiments, an end-to-end system comprising a voxel feature learning/detection network and a region proposal network may further include convolutional middle layers between the voxel feature learning/detection network and the region proposal network. For example, the integrated network, as shown in FIG. 2 includes convolutional middle layers 252 between voxel feature learning network 102 and region proposal network 150. In some embodiments, each convolution middle layer may apply 3D convolution, batch normalization (BN), and/or may include a rectified linear unit (ReLU) layer. In some embodiments, these layer may be applied sequentially. Conv3D($c_{in}$, $c_{out}$, k, s, p) may be used to represent each convolution mid layer, where $c_{in}$ is an input channel, $c_{out}$ is the output channel, k stands for kernel size, s represents stride size, and p denotes padding size, according to some embodiments. The Convolutional Mid Layers may aggregate voxel-wise features within a progressively expanding receptive field thereby potentially adding more context to shape description.

Figure 6:
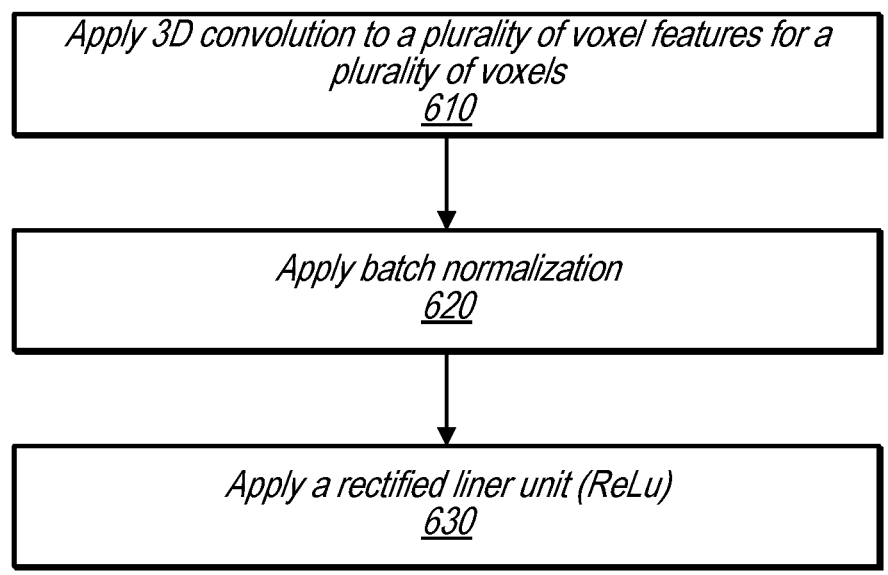
FIG. 6 is a flowchart illustrating a method for aggregating voxel-wise features using convolutional middle layers, according to some embodiments.

FIG. 6 is a flowchart illustrating a method for aggregating voxel wise features using convolutional middle layers, according to some embodiments.

At 610, 3D convolution is applied to the output of the voxel feature learning/detection network, e.g. the 4D sparse tensor as described above. At 620 batch normalization s applied to the output of 610 and at 630 the output of 620 is passed through a rectified liner unit (ReLu) layer. The effect of the convolutional middle layers as performed in 610-630 may be to transform the sparse 4D tensor representation provided by the voxel feature learning/detection network into a high-dimensional volumetric representation of the point cloud that is more easily processed by a region proposal network, such as region proposal network 250.

Region Proposal Network

Region proposal networks may be considered a building block of object detection frameworks. As described herein a region proposal network (RPN) may be modified and/or combined with the voxel feature learning/detection network described herein to form an end-to-end learning pipeline, according to some embodiments.

Figure 7:
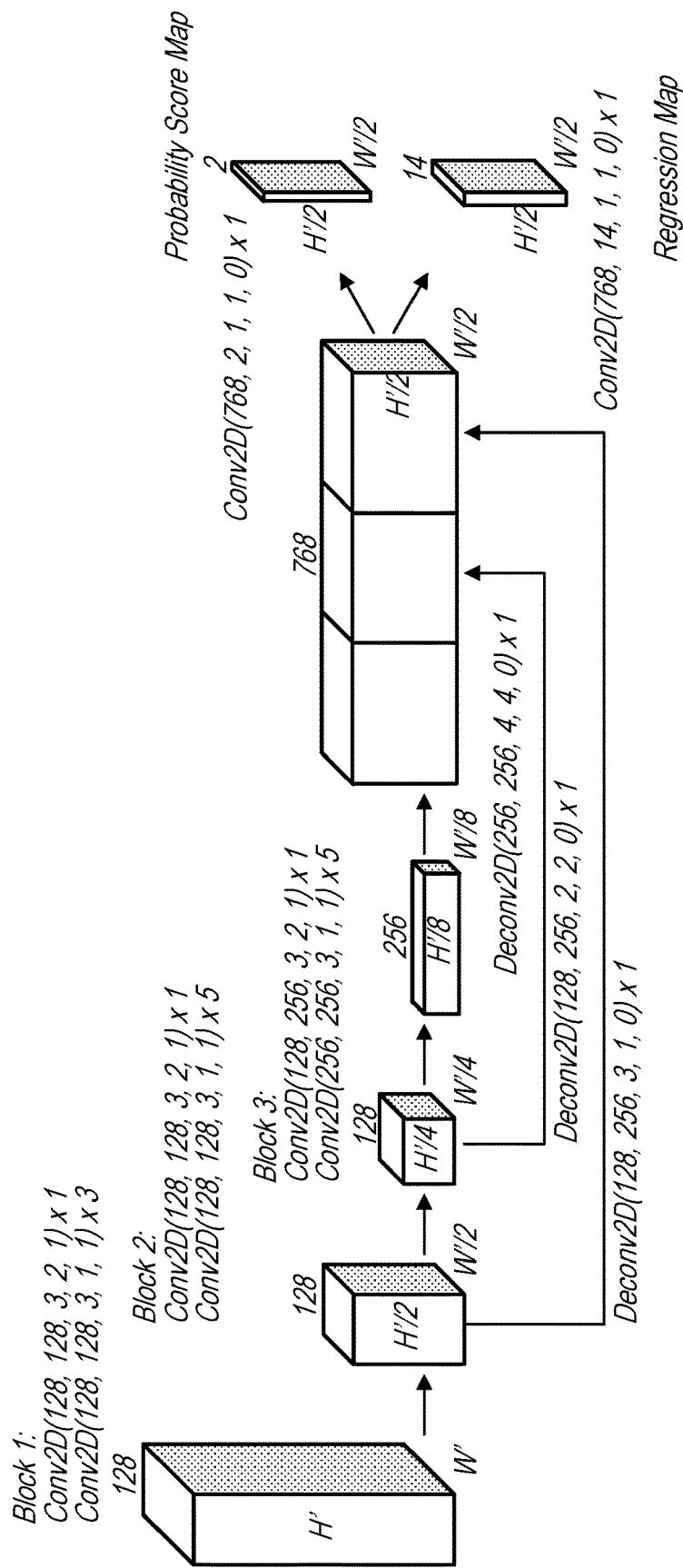
FIG. 7 is a logical block diagram illustrating an example region proposal network (RPN) that may be used with a voxel feature learning/detection network to form a generic 3D object detection network capable of end-to-end learning, according to some embodiments.

In some embodiments, the input to the region proposal network may be a feature map provided by the Convolutional Middle Layers (e.g. a high-dimensional volumetric representation of the point cloud). An example architecture of a region proposal network is illustrated in FIG. 7, according to one example framework for car detection. The region proposal network may have three fully convolutional layers followed by a pooling operation. Upsampling may allow low-resolution feature maps to share the same dimensions, in some embodiments. Finally, in some embodiments all scaled feature maps may be concatenated and mapped to the desired learning targets: (1) a probability score map, and (2) regression map.

End-to-End Training

Loss Function: Let $\{a_i^{pos}\}_{i=1 \ldots N_{pos}}$ be the set of $N_{pos}$ positive anchors and $\{a_j^{neg}\}_{i=1 \ldots N_{neg}}$ be the set of $N_{neg}$ negative anchors, according to one example embodiment. A 3D ground truth box (included in training data) may be parameterized as ($x_c^g$, $y_c^g$, $z_c^g$, $l^g$, $w^g$, $h^g$, $\theta^g$) where $x_c^g$, $y_c^g$, $z_c^g$ represent the center location, $l^g$, $w^g$, $h^g$ are length, width, height of the box, and $\theta^g$ is the yaw rotation around Z-axis. To reconstruct the ground truth box from a related positive anchor parameterized as ($x_c^g$, $y_c^g$, $z_c^g$, $l^g$, $w^g$, $h^g$, $\theta^g$), u*∈

$\mathbb{R}^7$ may be defined as the vector containing the 7 regression targets regarding center location $\Delta x$, $\Delta y$, $\Delta z$, three dimensions $\Delta l$, $\Delta w$, $\Delta h$, and rotation $\Delta \theta$, which may be computed as in equation 1 below:

$$\Delta x = \frac{x_c^g - x_c^a}{d^a}, \Delta y = \frac{y_c^g - y_c^a}{d^a}, \Delta z = \frac{z_c^g - z_c^a}{h^a},$$
$$\Delta l = \log\left(\frac{l^g}{l^a}\right), \Delta w = \log\left(\frac{w^g}{w^a}\right), \Delta h = \log\left(\frac{h^g}{h^a}\right),$$
$$\Delta \theta = \theta^g - \theta^a$$

where $d^a = \sqrt{(l^a)^2 + (w^a)^2}$ is the diagonal between length and width.

The oriented 3D box may, in some embodiments, be directly estimated and $\Delta x$ and $\Delta y$ may be normalized homogeneously with the diagonal $d^a$. In some embodiments, the loss function may be defined as in equation 2 below:

$$L = \alpha \frac{1}{N_{pos}} \sum_i L_{cls}(p_i^{pos}, 1) + \beta \frac{1}{N_{neg}} \sum_j L_{cls}(p_j^{neg}, 0) + \alpha \frac{1}{N_{reg}} \sum_i L_{reg}(u_i, u_i^*)$$

where $p_i^{pos}$ and $p_j^{neg}$ may represent the softmax output for positive anchor $a_i^{pos}$ and negative anchor $a_j^{neg}$ respectively, while $u_i \in \mathbb{R}^7$ and $u_i^* \in \mathbb{R}^7$ may be the regression output and ground truth for positive anchor $a_i^{pos}$. The first two terms may be normalized classification loss for $\{a_i^{pos}\}_{i=1 \ldots N_{pos}}$ and $\{a_j^{neg}\}_{j=1 \ldots N_{neg}}$, where the $L_{cls}$ stands for binary cross entropy loss and $\alpha$, $\beta$ may be positive constants balancing the relative importance between the two terms. For the regression loss, $L_{reg}$, SmoothL1 function may be used in some embodiment.

Example System Implementation

Figure 8:
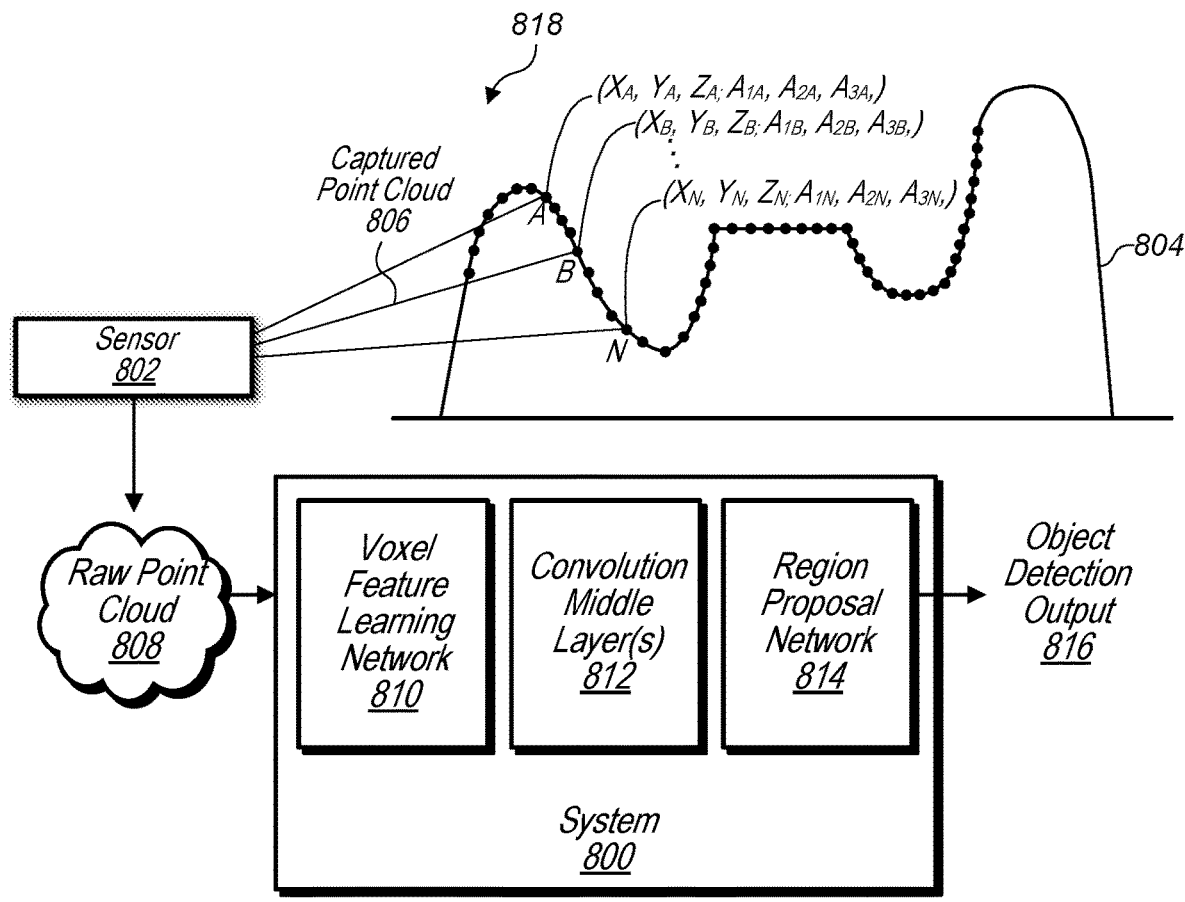
FIG. 8 illustrates an example system that receives a raw point cloud from a point cloud sensor and generates an object detection output using a voxel feature learning/detection network, according to some embodiments.

FIG. 8 illustrates an example system that receives a raw point cloud from a point cloud sensor and generates an object detection output using a voxel feature learning/detection network, according to some embodiments.

Figure 12:
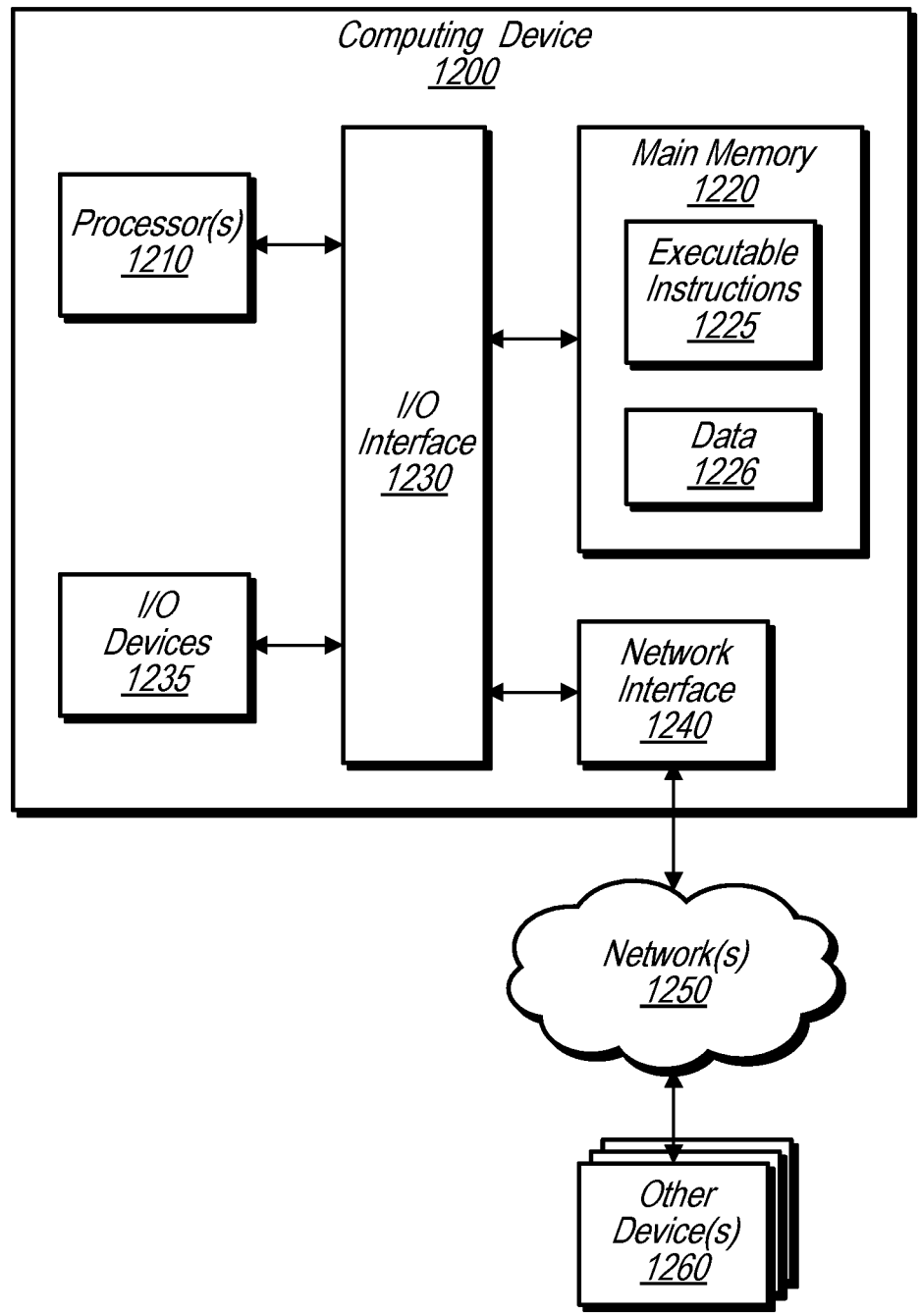
FIG. 12 is a logical block diagram illustrating one embodiment of a system configured to implement the methods and/or techniques described herein.

A system configured to implement a generic 3D detection network as described herein may include at least three functional blocks: (1) Voxel Feature Learning Network, (2) Convolution Middle Layers, and (3) Region Proposal Network, as illustrated in FIG. 8. For example, system 800 includes voxel feature learning network 810, convolutional middle layers 812, and region proposal network 814. System 800 may implemented using one or more computers 1200 as illustrated in FIG. 12. As illustrated in FIG. 8, the voxel feature learning network 810 may first take a raw point cloud 808 as input from a sensor 802, such as a LiDar sensor. The voxel feature learning network 810 may transform the raw point cloud into a more compact sparse 4D tensor. In addition, the convolutional middle layers 812 may further process the sparse 4D tensor into a dense high-dimensional volumetric representation, in some embodiments. Additionally, a region proposal network (RPN) 814 may generate 3D object detection output 816.

Sensor 802 captures a point cloud 806 comprising points representing structure 804 in view 818 of sensor 802. For example, in some embodiments, structure 804 may be a vehicle, pedestrian, cyclist, etc., or any other type of structure. In some embodiments, a captured point cloud, such as captured point cloud 806, may include spatial and attribute information for the points included in the point cloud. For example, point A of captured point cloud 806 comprises X, Y, Z coordinates and attributes 1, 2, and 3. In some embodiments, attributes of a point may include attributes such as a velocity at the point, an acceleration at the point, a reflectance of the structure at the point, a time stamp indicating when the point was captured, a string-value indicating a modality when the point was captured, for example "walking", or other attributes. The captured point cloud 806 may be provided to system 800 for object detection.

Efficient Implementation

Figure 9:
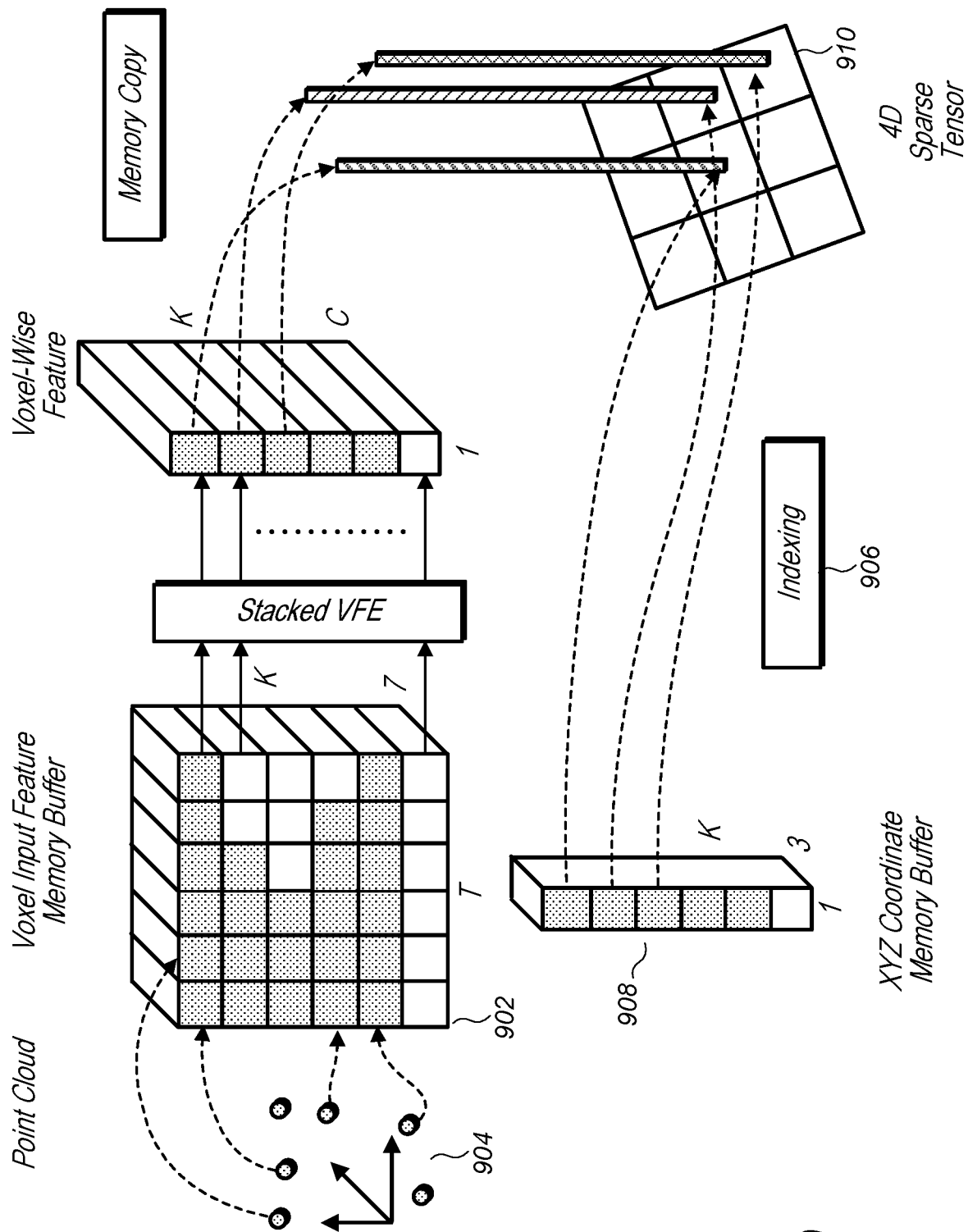
FIG. 9 is a logical block diagram illustrating one example implementation of a voxel feature learning/detection network, according to one embodiment.

FIG. 9 is a logical block diagram illustrating one example implementation of a voxel feature learning/detection network, according to one embodiment.

GPUs may be optimized for processing dense tensor structures. One potential problem with working directly with the point cloud may be that the points may be sparsely distributed across the space and each voxel may have a variable number of points rather than a fixed size vector. A system configured to implement the methods, systems and/or techniques described herein may convert the point cloud into a dense tensor structure where stacked VFE operations can be processed in parallel across points and voxels.

One method, according to some embodiments, for converting the point cloud into a dense tensor structure where stacked VFE operations can be processed in parallel across points and voxels is summarized in FIG. 9. A K×T×7 dimensional tensor structure (902) may be initialized to store voxel input feature buffer where K is the maximum number of non-empty voxels, T is the maximum number of points per voxel, and 7 is the encoding for each point. The points may be randomized before processing. For each point in the point cloud (904), the method may check if the corresponding voxel already exists. In some embodiments, this may be done efficiently using an O(1) lookup operation using a hash table (e.g. index 906) where the voxel coordinate is used as the hash key. If the voxel is already initialized the method may insert the point to the voxel location if there are less than T points, otherwise the point may be ignored. If the voxel is not initialized, the method may initialize a new voxel, store its coordinate in a voxel coordinate buffer, and insert the point to this new voxel location. The voxel input feature and coordinate buffers (908) may be constructed via a single pass over the point list, therefore its complexity is O(n). To further improve the memory/compute efficiency it may be possible to only store a limited number of voxels (K) and ignore points coming from voxels with few points, according to some embodiments.

After the voxel input buffer is constructed, the stacked voxel feature encoding (VFE) may only involve point level and voxel level dense operations which may be computed on a GPU in parallel with computations for other points and/or voxels. Note that before the max-pooling and after concatenation operations in VFE, the method may include resetting the features corresponding to empty points to zero such that they do not have effect on the computed voxel-wise feature. Additionally, using the stored coordinate buffer the method may reorganize the computed voxel-wise structures to the voxel grid (910).

Example Training

Figure 10:
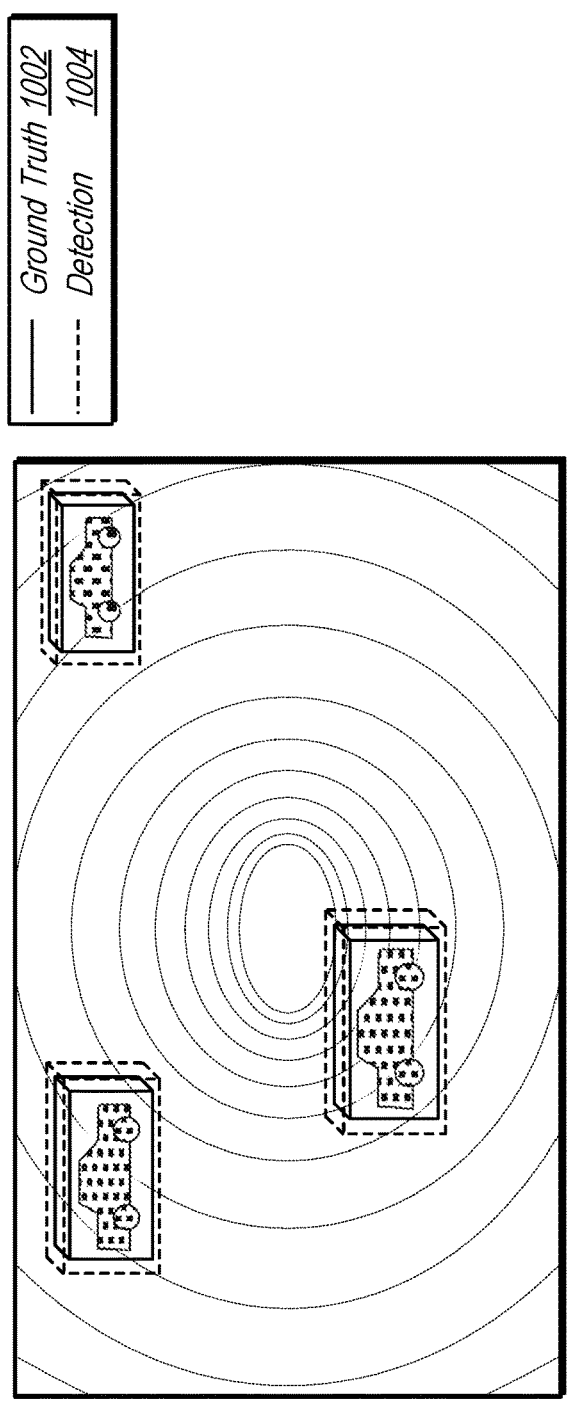
FIG. 10 illustrates an example of training data for vehicle detection that may be used to train a voxel feature learning/detection network, according to some embodiments.

FIG. 10 illustrates an example of training data for vehicle detection that may be used to train a voxel feature learning/detection network, according to some embodiments. For example training data may include ground truth object regions 1002 that may be compared to detected 3D object regions.

Figure 11:
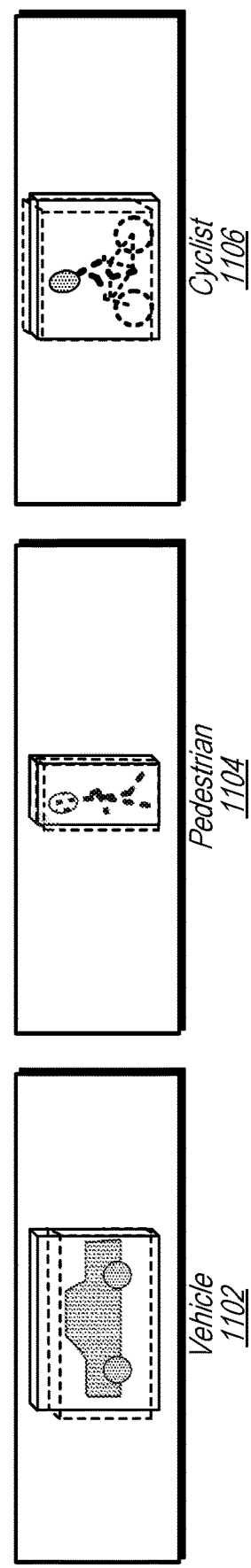
FIG. 11 illustrates example types of objects that may be identified by an object detection system that includes a voxel feature learning/detection network, according to some embodiments.

FIG. 11 illustrates example types of objects that may be identified by an object detection system that includes a voxel feature learning/detection network, according to some embodiments. In addition to vehicle (1102) training data, a voxel feature learning/detection network may be trained to identify other types of objects such as pedestrians 1104, cyclists 1106, etc.

One experimental setup according to one example embodiment may be based on the LiDAR specifications of the KITTI dataset.

Car Detection: For this task, point clouds within the range of [−3; 1]×[−40; 40]×[0; 70.4] meters along Z, Y, X axis respectively may be considered. Points that are projected outside of image boundaries may be removed. According to the example embodiment described herein, voxel size as vD=0.4, vH=0.2, vW=0.2 meters may be chosen which leads to D'=10, H'=400, W'=352. Additionally, T=35 may be set as the maximum number of randomly sampled points in each non-empty voxel. Furthermore, two VFE layers VFE-1(7, 32) and VFE-2(32, 128) may be used and the final Fully Connected Neural Net (FCNN) may map VFE-2 output to $\mathbb{R}^{128}$.

Thus, the voxel feature learning/detection network described herein may generate a sparse tensor of shape 128×10×400×352, according to some embodiments. To aggregate voxel-wise features, the system may employ three Convolution Mid Layers sequentially as Conv3D(128, 64, 3, (2,1,1), (1,1,1)), Conv3D(64, 64, 3, (1,1,1), (0,1,1)) and Conv3D(64, 64, 3, (2,1,1), (1,1,1)), which yields 4D tensor of size 64×2×400×352. After reshaping, the input to a regional proposal network may be a feature map of size 128×400×352, where the dimensions may correspond to channel, height, and width of the 3D tensor. FIG. 7 illustrates the detailed network architecture for this task. In FIG. 7 the same layer schema is used as described above regarding end-to-end training for Conv2D($c_{in}$, $c_{out}$, k, s, p) and Deconv2D($c_{in}$, $c_{out}$, k, s, p). In some embodiments, only one anchor size ($l^a$=3.9, $w^a$=1.6, $h^a$=1.56) meters with two rotations, 0 and 90 degrees may be used. One example anchor matching criteria may be as follows according to some embodiments: An anchor may be assigned as positive if it has the highest Intersection over Union (IoU) with a ground truth or its IoU with ground truth is above 0.6. An anchor may be considered as negative if the IoU between it and all ground truth boxes is less than 0.45. The system may treat anchors as don't care if they have 0.45≤IoU≤0.6 with any ground truth. In some embodiments, set α=1.5 and β=1 in Eqn. 2.

Pedestrian and Cyclist Detection: The input range (empirical observation suggest that beyond this range, LiDAR reflections from a pedestrian or cyclist may become very sparse and therefore detection results may be unreliable) may be [−3, 1] [−20, 20] [0, 48] meters along Z, Y, X axis respectively. Using the same voxel size as for car detection may yield D=10, H=200, W=240. In some embodiments, the system may set T=45, such as to potentially obtain more LiDAR points for potentially better capturing shape information. As was done for car detection, in some embodiments the system may employ two VFE layers, i.e., VFE-1(7, 32), VFE-2(32, 128), and three Convolution Mid Layers i.e., Conv3D(128, 64, 3, (2,1,1), (1,1,1)), Conv3D(64, 64, 3, (1,1,1), (0,1,1)) and Conv3D(64, 64, 3, (2,1,1), (1,1,1)). For the region proposal network, the stride size in the first 2D convolution may be changed from 2 to 1, according to some embodiments. This may allow finer resolution in anchor matching, which may be necessary for detecting pedestrians and cyclists. The system may also use anchor size $l^a$=0.8, $w^a$=0.6, $h^a$=1.73 meters with 0 and 90 degrees rotation for pedestrian detection and use anchor size $l^a$=1.76, $w^a$=0.6, $h^a$=1.73 meters with 0 and 90 degrees rotation for cyclist detection. One specific example of anchor matching criteria may be as following: assign an anchor as positive if it has the highest IoU with a ground truth, or its IoU with ground truth is above 0.5. An anchor may be considered as negative if its IoU with every ground truth is less than 0.35. For anchors having 0.35≤IoU≤0.5 with any ground truth, the system treat them as don't care. According to one example embodiment, the system may set α=1.5 and β=1.5 in Eqn. 2.

During training, stochastic gradient descent (SGD) may be used with learning rate 0.01 for the first 150 epochs and decrease the learning rate to 0.001 for the last 10 epochs, according to one example embodiment. Additionally, a batch size of 16 point clouds may be used.

Data Augmentation

With less than 4000 training point clouds, training a voxel feature learning/detection network from scratch may suffer from overfitting in some embodiments. To reduce this issue, three different forms of data augmentation may, in some embodiments, be introduced. In some embodiments, augmented training data may be generated on-the-fly without the need to be stored (e.g., on disk).

Set M={$p_i$=[$x_i$, $y_i$, $z_i$, $r_i$]$^T \in \mathbb{R}^4$}$_{i=1,\ldots,N}$ may be defined as the whole point cloud, consisting of N points. In one embodiment, a specific 3D bounding box bi may be parameterized as ($x_c$, $y_c$, $z_c$, l, w, h, θ), where xc; yc; zc are center locations of $b_i$, l, w, h are length, width, height of the box, and θ is the yaw rotation around Z-axis. In one embodiments, $\Omega_i$={p|x∈[$x_c$−l/2, $x_c$+l/2], y∈[$y_c$−w/2, $y_c$+w/2], z∈[$z_c$−h/2, $z_c$+h/2], p∈M} may be defined as the set containing all LiDAR points within b, where p=[x, y, z, r] denotes a particular LiDAR points in the whole set M.

The first form of data augmentation may apply perturbation independently to each ground truth 3D bounding box together with those LiDAR points within the box. Specifically, around Z-axis rotate $b_i$ and the associated $\Omega_i$ with respect to ($x_c$, $y_c$, $z_c$) by a uniformally distributed random variable Δθ∈[−π/10, +π/10], according to one embodiment. Additionally, a translation (Δx, Δy, Δz) may be added to the XYZ components of $b_i$ and to each point in $\Omega_i$, where Δx, Δy, Δz are drawn independently from a Gaussian distribution with mean zero and standard deviation 1.0. To avoid physically impossible outcomes, in some embodiments a collision test may be performed between any two boxes after the perturbation and recovered to the original if collision is detected. Since the perturbation may be applied to each ground truth and the associated LiDAR points independently, the network may be able to learn from substantially more variations than from the original training data, according to some embodiments.

Additionally, the system may apply global scaling to all ground truth boxes $b_i$ and to the whole point cloud M. For example, the system may multiply a random variable drawn from uniform distribution [0.95, 1.05] to the XYZ coordinates and three dimensions for each $b_i$ and multiply the same scaling factor to XYZ coordinates of every points in M. Introduction of scaling randomness may improve network robustness in detecting objects from different distances and with diverse sizes. In some embodiments, this technique may be effective in image-based classification and detection tasks.

Furthermore, the system may employ global rotation to all ground truth boxes $b_i$ and to the whole point cloud M in some embodiments. The rotation may be applied along Z-axis and around (0, 0, 0). In one embodiment, the global rotation offset may be determined by sampling from uniform distribution [−π/4, +π/4]. In the some embodiments, the system may be configured to simulate the situations when a vehicle is making turns, such as by rotating the entire point cloud.

Experiments

As described below, one example voxel feature learning/detection network may be evaluated on the KITTI 3D object detection benchmark. The dataset contains 7,481 training images/point clouds and 7,518 test images/point clouds, covering three categories: Car, Pedestrian, and Cyclist. For each class, detection outcomes may be evaluated based on three difficulty levels: easy, moderate, and hard, which may be determined according to object size, occlusion condition, and truncation level. Since the ground truth for such a test set may not be accessible, the training data may be subdivided into a training set and a validation set, which may result in 3,712 data samples for training and 3,769 data samples for validation, according to one example embodiment. The split may avoid images from the same sequence being included in both the training and the validation set.

For the Car category, the performance of a generic 3D detection network comprising a voxel feature learning/baseline, as input, a bird's eye feature map may be computed using a discretization resolution of 0.1 m. However, the number of height channels may be increased from 4 to 16, to capture more shape detail. In the example experiments described herein, further increasing height channels may not lead to performance improvement but may impose heavier computational cost. Additionally, the input may be transposed with three 2D convolution layers, such as Conv2D(16, 32, 3, 1, 1), Conv2D(32, 64, 3, 2, 1), Conv2D(64, 128, 3, 1, 1). In this way, a feature map may be obtained and fed to a Region Proposal Net as shown in FIG. 7.

To further demonstrate the capability of a generic 3D detection network that includes a voxel feature learning/detection network as described herein, performance in 3D detection and bird's eye view detection of Pedestrian and Cyclist may also be evaluated. Since there is no previously published results about detecting these two categories in 3D space, evaluation results may be compared a strong baseline described below.

TABLE 1

Performance Comparison in bird's eye view detection: average precision (in %) on KITTI validation set.

| | | Car | | | Pedestrian | | | cyclist | | |
|---|---|---|---|---|---|---|---|---|---|---|
| Method | Modality | Easy | Mod | Hard | Easy | Mod | Hard | Easy | mod | hard |
| Mono3D | mono | 5.22 | 5.19 | 4.13 | N/A | N/A | N/A | N/A | N/A | N/A |
| 3DOP | stereo | 12.63 | 9.49 | 7.59 | N/A | N/A | N/A | N/A | N/A | N/A |
| VeloFCN | LiDAR | 40.14 | 32.08 | 30.47 | N/A | N/A | N/A | N/A | N/A | N/A |
| MV(BV_FV) | LiDAR | 86.18 | 77.32 | 76.33 | N/A | N/A | N/A | N/A | N/A | N/A |
| MV (BV + FV + RGB) | LiDAR + mono | 86.55 | 78.10 | 76.67 | N/A | N/A | N/A | N/A | N/A | N/A |
| baseline | LiDAR | 88.26 | 78.42 | 77.66 | 58.96 | 53.79 | 51.47 | N/A | N/A | N/A |
| VoxelNet | LiDAR | 89.60 | 84.81 | 78.57 | 65.95 | 61.05 | 56.98 | 74.41 | 52.18 | 50.49 |

TABLE 2

Performance Comparison in 3D detection: average precision (in %) on KITTI validation set.

| | | Car | | | Pedestrian | | | cyclist | | |
|---|---|---|---|---|---|---|---|---|---|---|
| Method | Modality | Easy | Mod | Hard | Easy | Mod | Hard | Easy | mod | hard |
| Mono3D | mono | 2.53 | 2.31 | 2.31 | N/A | N/A | N/A | N/A | N/A | N/A |
| 3DOP | stereo | 6.55 | 5.07 | 4.10 | N/A | N/A | N/A | N/A | N/A | N/A |
| VeloFCN | LiDAR | 15.20 | 13.66 | 15.98 | N/A | N/A | N/A | N/A | N/A | N/A |
| MV(BV_FV) | LiDAR | 71.19 | 56.60 | 55.30 | N/A | N/A | N/A | N/A | N/A | N/A |
| MV (BV + FV + RGB) | LiDAR + mono | 71.29 | 62.68 | 56.56 | N/A | N/A | N/A | N/A | N/A | N/A |
| baseline | LiDAR | 71.73 | 59.75 | 55.69 | 43.95 | 40.18 | 37.48 | N/A | N/A | N/A |
| VoxelNet | LiDAR | 81.97 | 65.46 | 62.85 | 57.86 | 53.42 | 48.87 | 67.17 | 47.65 | 45.11 | detection network in 3D detection and bird's eye view detection may be examined. The evaluation compares the proposed method with several other algorithms, such as: Mono3D and 3DOP; LiDAR based approach: VeloFCN and 3D-FCN; and a multi-modality based approach MV. In contrast to using pre-trained model for initialization, in some embodiments, the network may be trained from scratch based on only the augmented training data.

To fully justify the effectiveness of end-to-end learning, a strong baseline may be implemented and compared with a generic 3D detection network that includes a voxel feature learning/detection network as described herein. For this Evaluation on KITTI Validation Set Metrics: According to the example experiments and evaluations described herein, the official KITTI evaluation protocol is followed, where the IoU threshold is 0.7 for class Car and is 0.5 for class Pedestrian and Cyclist. The IoU threshold may be the same for both bird's eye view and full 3D evaluation.

Evaluation in Bird's Eye View: The generic 3D detection network that includes a voxel feature learning/detection network as described herein may be compared with other approaches, such as by means of computing Average Precision (AP). Comparison results are listed in Table 1. The generic 3D detection network that includes a voxel feature learning/detection network as described herein may consistently outperform all the competing approaches across all three difficulty levels, according to one example embodiment. The baseline approach also achieves satisfactory performance compared to other approaches, which shows that the example base region proposal network (RPN) may be effective. For the detection task of Pedestrian and Cyclist in bird's eye view, the generic 3D detection network that includes a voxel feature learning/detection network as described herein may be compared with the strong baseline. Table 1 illustrates, according to one example embodiment, that the generic 3D detection network that includes a voxel feature learning/detection network as described herein may yield substantially higher average precision (AP) than the baseline, thus showing the improvements of end-to-end feature learning over manual feature engineering.

Evaluation in 3D: Compared to bird's eye view detection which requires only accurate localization of objects in the 2D plane, 3D detection may be considered a more challenging task as it may require characterization of 3D shape information for each object. Table 2 summarizes performance results of a comparison between one embodiment of the generic 3D detection network that includes a voxel feature learning/detection network as described herein and other alternative methods. For the class Car, the generic 3D detection network that includes a voxel feature learning/detection network as described herein may significantly exceed all other approaches in AP across all difficulty levels, according to one embodiment. Specifically, using only LiDAR, the system significantly outperforms the method MV (BV+FV+RGB) based on LiDAR+RGB, by 10.68%, 2.78% and 6.29% in easy, moderate and hard levels respectively. Also, with only bird's eye view projection, the baseline may achieve better results than MV (BV+FV) using both bird's eye view projection and cylinder front view map.

As in bird's eye view evaluation, one embodiment of the generic 3D detection network that includes a voxel feature learning/detection network as described herein is compared with the baseline on 3D Pedestrian and Cyclist detection. Successful detection of these two classes may require an algorithm to capture intrinsic 3D shape information, such as due to a high variation among poses. As shown in Table 2, the end-to-end feature learning algorithm described herein may outperform the baseline approach (despite the fact that both of them share the same base RPN). Moreover, across three difficulty levels, the average performance difference between the system and the baseline may increase from ~6% in bird's eye view to ~13% in 3D, which potentially verifies that the generic 3D detection network that includes a voxel feature learning/detection network as described herein may be more effective in capturing 3D shape information than hand-crafted features, according to some embodiments.

Evaluation on KITTI Test Set

One embodiment of a system configured to implement a generic 3D detection network that includes a voxel feature learning/detection network as described herein may be evaluated on the KITTI test set by submitting detection results to the official server. The results are summarized in Table 3, according to one example embodiment. As illustrated in Table 3, using only LiDAR a generic 3D detection network that includes a voxel feature learning/detection network as described herein may significantly outperform LiDAR based 3D detection algorithm and may also improve LiDAR and RGB based solution in 5 out of 6 categories in the car detection task, according to one example embodiment.

TABLE 3

Performance evaluation on KITTI test set.

| Benchmark | Easy | Moderate | Hard |
| --- | --- | --- | --- |
| Car (3D Detection) | 74.60% | 61.23% | 55.52% |
| Car (Bird's Eye View) | 89.25% | 79.34% | 77.07% |
| Pedestrian (3D Detection | 42.43% | 36.30% | 33.67% |
| Pedestrian (Bird's Eye View) | 47.83% | 42.08% | 39.63% |
| Cyclist (3D Detection) | 61.22% | 48.36% | 44.37% |
| Cyclist (Bird's Eye View) | 66.70% | 54.76% | 50.55% |

Conclusion

Most existing traditional efforts in LiDAR-based 3D detection rely on hand-crafted feature representations (e.g., bird's eye view projection). In contrast, a generic 3D detection network that includes a voxel feature learning/detection network as described herein may be considered a novel end-to-end trainable deep architecture for point cloud based 3D detection. A system configured to implement a generic 3D detection network as described herein may, in some embodiments, directly operate on sparse 3D points and may effectively capture 3D shape information. In some embodiments, the system may benefit from point cloud sparsity and parallel processing on a voxel grid. Example experiments on the KITTI car detection task show that the system may outperform state-of-the-art LiDAR based 3D detection methods by a large margin and may even surpass the accuracy of approaches fusing both RGB image and LiDAR. On more challenging tasks, such as 3D detection of pedestrians and cyclists, the system also demonstrates good performance, due to its capability in effectively capturing various geometries.

In some embodiments, the generic 3D detection network that includes a voxel feature learning/detection network as described herein may be extended by fusing RGB and jointly training a box refinement network, such as to further improve detection accuracy. In addition, training the system with multi-class supervision information may overcome the ambiguity between similar classes, according to some embodiments.

Example Computer System

In at least some embodiments, a system and/or server that implements a portion or all of one or more of the methods and/or techniques described herein, including the techniques to refine synthetic images, to train and execute machine learning algorithms including neural network algorithms, and the like, may include a general-purpose computer system that includes or is configured to access one or more computer-accessible media. FIG. 12 illustrates such a general-purpose computing device 1200. In the illustrated embodiment, computing device 1200 includes one or more processors 1210 coupled to a main memory 1220 (which may comprise both non-volatile and volatile memory modules, and may also be referred to as system memory) via an input/output (I/O) interface 1230. Computing device 1200 further includes a network interface 1240 coupled to I/O interface 1230, as well as additional I/O devices 1235 which may include sensors of various types.

In various embodiments, computing device 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. In some implementations, graphics processing units (GPUs) may be used instead of, or in addition to, conventional processors.

Memory 1220 may be configured to store instructions and data accessible by processor(s) 1210. In at least some embodiments, the memory 1220 may comprise both volatile and non-volatile portions; in other embodiments, only volatile memory may be used. In various embodiments, the volatile portion of system memory 1220 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 1225 and data 1226 implementing one or more desired functions, such as those methods, techniques, and data described above, are shown stored within main memory 1220.

In one embodiment, I/O interface 1230 may be configured to coordinate I/O traffic between processor 1210, main memory 1220, and various peripheral devices, including network interface 1240 or other peripheral interfaces such as various types of persistent and/or volatile storage devices, sensor devices, etc. In some embodiments, I/O interface 1230 may perform any necessary protocol, timing or other data transformations to convert data signals from one component (e.g., main memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components. Also, in some embodiments some or all of the functionality of I/O interface 1230, such as an interface to memory 1220, may be incorporated directly into processor 1210.

Network interface 1240 may be configured to allow data to be exchanged between computing device 1200 and other devices 1260 attached to a network or networks 1250, such as other computer systems or devices as illustrated in FIG. 1 through FIG. 11, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, main memory 1220 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Various embodiments may further include receiving, sending or storing instructions and/or data implemented in accordance with the foregoing description upon a computer-accessible medium. Generally speaking, a computer-accessible medium may include non-transitory storage media or memory media such as magnetic or optical media, e.g., disk or DVD/CD coupled to computing device 1200 via I/O interface 1230. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 1200 as main memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

The various methods and/or techniques as illustrated in the figures and described herein represent exemplary embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended to embrace all such modifications and changes and, accordingly, the above description to be regarded in an illustrative rather than a restrictive sense.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising one or more processors and a memory coupled to the one or more processors, wherein the memory comprises program instructions configured to:
   implement, via the one or more processors, a voxel feature learning network, wherein the voxel feature learning network is configured to:
      receive a point cloud comprising a plurality of points located in a three-dimensional space;
      group respective sets of the points of the point cloud into respective voxels, wherein the respective points are grouped into the respective voxels based on locations of the respective points in the three-dimensional space and locations of the voxels in the three-dimensional space, wherein each voxel corresponds to a volume segment of the three-dimensional space;
      determine, for each of one or more of the respective voxels, a plurality of point-wise concatenated features from the respective points included in the respective voxel, wherein to determine the point-wise concatenated features for a given one of the respective voxels, the program instructions are configured to:
         identify a plurality of point-wise determined features;
         determine a locally aggregated feature from the identified plurality of point-wise determined features via element-wise max-pooling across the plurality of point-wise determined features; and
         augment, based on the locally aggregated feature, the respective ones of the point-wise features for the points to form respective point-wise concatenated features;
      determine, for each of one or more of the respective voxels, a voxel feature, wherein the voxel feature is determined based on the plurality of point-wise concatenated features determined from the respective points included in the voxel; and
      provide a four-dimensional (4D) tensor representation of the point cloud comprising the determined voxel features.

2. The system of claim 1, further comprising:
   one or more Lidar sensors configured to capture the plurality of points that make up the point cloud,
   wherein the point cloud is received by the voxel feature learning network as a raw point cloud captured by the one or more Lidar sensors.

3. The system of claim 1, wherein the one or more processors and the memory, or one or more additional processors and an additional memory, include program instructions configured to implement:
   one or more convolutional middle layers configured to process the 4D tensor into a high-dimensional volumetric representation of the point cloud; and
   a region proposal network configured to generate a three dimensional (3D) object detection output determined based at least in part on the high-dimensional volumetric representation of the point cloud.

4. The system of claim 3, wherein the voxel feature learning network comprises a first fully-connected neural network, and
   wherein the region proposal network comprises an additional fully-connected neural network.

5. The system of claim 4, wherein the first fully-connected neural network is trained to identify voxel features based on training data,
   wherein the training data comprises ground truth 3D bounding boxes corresponding to objects included in a training point cloud, and
   wherein errors between the ground truth 3D bounding boxes and 3D bounding boxes identified by the region proposal network are used to train the first fully connected neural network and the additional fully connected neural network.

6. The system of claim 5, wherein the program instructions are configured to cause the system to augment the training data, wherein to augment the training data, the program instructions cause the one or more processors to:
   apply a perturbation to each ground truth 3D bounding box and independently apply a perturbation to the points of the training point cloud that are included in the respective ground truth 3D bounding boxes;
   apply a global scaling to each ground truth 3D bounding box; or
   apply a global rotation to each ground truth 3D bounding box and to the training point cloud, wherein the global rotation simulates a vehicle making a turn.

7. The system of claim 1, wherein, for each of the one or more voxels, to determine the voxel feature based on the point-wise concatenated features identified from the respective points included in the voxel, the voxel feature learning network is configured to:
   transform the plurality of concatenated point-wise features, via a fully-connected neural network, into the voxel feature, wherein the fully connected neural network comprises a linear layer, a batch normalization layer, and/or a rectified linear unit (ReLU) layer.

8. The system of claim 7, wherein element-wise max-pooling is applied to transform the plurality of concatenated point-wise features into the voxel feature.

9. The system of claim 1, wherein to group the respective sets of the points of the point cloud into the respective voxels, the voxel feature learning network is configured to:
   for a voxel for which a set of respective points in three-dimensional space corresponding to the voxel is less than a threshold number of points, assign all of the respective points in three-dimensional space corresponding to the voxel to the voxel; and
   for another voxel for which another set of respective points in three-dimensional space corresponding to the other voxel is greater than the threshold number of points, randomly sample the respective points in three-dimensional space corresponding to the other voxel for inclusion in the other voxel, such that the number of points included in the other voxel is less than or equal to the threshold number of points.

10. The system of claim 1, wherein the voxel feature learning network is implemented via a plurality of processors, and wherein the plurality of processors are configured to determine, in parallel, respective voxel features for a plurality of respective voxels.

11. A computer implemented method, comprising:
performing by one or more computers:
subdividing a three-dimensional (3D) space of a point cloud into equally spaced voxels, wherein the point cloud includes information regarding one or more points within a 3D coordinate system, and wherein each of the one or more points resides in one of the voxels;
grouping the points of the point cloud according the particular respective voxels in which they reside;
determining, for each of one or more of the respective voxels, a plurality of point-wise concatenated features based on the selected points residing in the respective voxel, wherein determining the point-wise concatenated features for a given voxel of the respective voxels comprises:
identifying a plurality of point-wise determined features;
determining a locally aggregated feature from the identified plurality of point-wise determined features via element-wise max-pooling across the plurality of point-wise determined features; and
augmenting, based on the locally aggregated feature, the respective ones of the point-wise features for the points to form respective point-wise concatenated features;
determining voxel features based on the point-wise concatenated features determined for the respective one or more voxels; and
representing the determined voxel features as a sparse 4D tensor.

12. The computer implemented method of claim 11, wherein said determining the plurality of point-wise concatenated features further comprises:
computing a local mean as a centroid of points within the given voxel;
augmenting each point residing within the given voxel with an offset relative to the computed centroid;
transforming each augmented point into a feature space;
encoding, based on the augmented points transformed into the feature space, the shape of a surface encapsulated by the points residing within the voxel,
wherein the identified point-wise features are identified and the locally aggregated feature is determined based on the augmented points in the feature space.

13. The method of claim 12, wherein said transforming comprises transforming the augmented points via a fully-connected neural network.

14. The method of claim 12, wherein said encoding the surface shape is performed based on aggregating information from the augmented points in the feature space.

15. The method of claim 11, wherein said determining the point-wise concatenated features comprises identifying the point-wise concatenated features using one or more voxel feature encoding layers within a neural network.

16. The method of claim 15, further comprising performing by the one or more computers:
encoding, via the voxel feature encoding layers, point interactions within a voxel; and
learning, by the neural network, one or more pieces of descriptive shape information.

17. The method of claim 11, wherein said subdividing, said grouping, said determining the point-wise concatenated features, said determining the voxel-wise features, and said representing are performed by a neural network executing on the one or more computers, wherein the neural network comprises:
one or more 3D convolutions layers;
one or more Batch Normalization layers (BN); and/or
one or more rectified linear unit (ReLU) layers.

18. The method of claim 11, further comprising:
processing the 4D tensor, via one or more convolutional middle layers, into a dense high-dimensional volumetric representation of the point cloud; and
identifying, by a regional proposal network, one or more objects in the point cloud based on the dense high-dimensional volumetric representation of the point cloud.

19. The method of claim 11, further comprising:
performing 3D scene understanding, point cloud matching, or human pose estimation, based on the sparse 4D tensor.

20. A non-transitory, computer-readable storage medium storing program instructions, that when executed on one or more computers, cause the one or more computers to:
receive a point cloud comprising a plurality of points located in a three-dimensional space;
group respective sets of the points of the point cloud into respective voxels, wherein the respective points are grouped into the respective voxels based on locations of the respective points in the three-dimensional space and positions of the voxels in the three-dimensional space, wherein each voxel corresponds to a volume segment of the three-dimensional space;
determine, for each of one or more of the respective voxels, a plurality of point-wise concatenated features from the respective points included in the respective voxel, wherein to determine the point-wise concatenated features for a given one of the respective voxels, the program instructions, when executed on the one or more computers, cause the one or more computers to:
identify a plurality of point-wise determined features;
determine a locally aggregated feature from the identified plurality of point-wise determined features via element-wise max-pooling across the plurality of point-wise determined features; and
augment, based on the locally aggregated feature, the respective ones of the point-wise features for the points to form respective point-wise concatenated features;
determine, for each of one or more of the respective voxels, a voxel feature, wherein the voxel feature is determined based on the point-wise concatenated features determined from the respective points included in the voxel; and
provide a four-dimensional (4D) tensor representation of the point cloud comprising the determined voxel features as one of the four dimensions.

* * * * *